(12) United States Patent
Renaldi et al.

(10) Patent No.: US 10,158,971 B1
(45) Date of Patent: *Dec. 18, 2018

(54) COMMUNICATING LOCATION TRACKING INFORMATION BASED ON ENERGY CONSUMPTION ASPECTS

(71) Applicant: JIO, Inc., Chicago, IL (US)

(72) Inventors: John A. Renaldi, Park Ridge, IL (US); Roger W. Ady, Chicago, IL (US)

(73) Assignee: JIO, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,501

(22) Filed: Aug. 23, 2018

Related U.S. Application Data

(63) Continuation of application No. 15/967,258, filed on Apr. 30, 2018, now Pat. No. 10,064,002, which is a continuation of application No. 15/829,730, filed on Dec. 1, 2017, now Pat. No. 9,980,087, which is a continuation-in-part of application No. 15/630,718, filed on Jun. 22, 2017.

(60) Provisional application No. 62/354,523, filed on Jun. 24, 2016.

(51) Int. Cl.
*H04W 4/02* (2018.01)
*H04L 29/08* (2006.01)
*H04W 64/00* (2009.01)

(52) U.S. Cl.
CPC ............... *H04W 4/02* (2013.01); *H04L 67/18* (2013.01); *H04W 64/00* (2013.01)

(58) Field of Classification Search
CPC ....... H04W 4/02; H04W 64/00; H04W 48/04; H04W 60/00; H04W 76/007; H04W 8/08; H04W 4/22; G01C 21/00; H04M 3/5116; G08B 25/016; G08B 25/12; H04L 67/18
See application file for complete search history.

(56) References Cited

U.S. PATENT DOCUMENTS

| | | | |
|---|---|---|---|
| 6,414,635 B1 * | 7/2002 | Stewart | G01S 5/12 342/457 |
| 9,642,529 B1 * | 5/2017 | Siddiqui | A61B 5/0008 |
| 9,681,259 B1 * | 6/2017 | Ortega | H04W 4/02 |

(Continued)

*Primary Examiner* — Babar Sarwar
(74) *Attorney, Agent, or Firm* — Garlick & Markison; Timothy W. Markison; Gary W. Grube

(57) ABSTRACT

A method includes obtaining a change indicator associated with location tracking communication from a first communication device to a second communication device regarding location information of the first communication device, where the location tracking communication is based on a first locating category option for an energy consumption function locating category and a second locating category option for a location modality category. The method further includes selecting a different first locating category option and determining whether the different first locating category option affects a selection of the second locating category option. When the different first locating category option does not affect the selection of the second locating category option, the method further includes facilitating the location tracking communication from the first communication device to the second communication device regarding the location information based on the different first locating category option and the second locating category option.

20 Claims, 11 Drawing Sheets

(56) References Cited

U.S. PATENT DOCUMENTS

| | | | |
|---|---|---|---|
| 9,870,715 B2* | 1/2018 | Sadeh-Koniecpol | ........................ G09B 19/00 |
| 2004/0229564 A1* | 11/2004 | Huang | .................... G01S 19/03 455/41.2 |
| 2008/0040023 A1* | 2/2008 | Breed | ................. B60N 2/2863 701/117 |
| 2009/0047972 A1* | 2/2009 | Neeraj | .................. G06Q 10/10 455/456.1 |
| 2009/0100145 A1* | 4/2009 | Szeto | .................... G06F 15/173 709/217 |
| 2010/0151887 A1* | 6/2010 | Bobier | .................. G06Q 10/10 455/457 |
| 2010/0299060 A1* | 11/2010 | Snavely | ................ G06Q 10/02 701/533 |
| 2010/0325194 A1* | 12/2010 | Williamson | ............ H04W 4/02 709/203 |
| 2011/0106736 A1* | 5/2011 | Aharonson | .......... G06Q 10/109 706/12 |
| 2013/0252591 A1* | 9/2013 | Sasaki | .................. H04W 4/001 455/414.1 |
| 2014/0003373 A1* | 1/2014 | Hakola | ................ H04W 48/16 370/329 |
| 2016/0049014 A1* | 2/2016 | Wells | .................... G07B 15/02 705/13 |
| 2017/0104872 A1* | 4/2017 | Ristock | ............... H04M 3/5125 |
| 2017/0164332 A1* | 6/2017 | Kim | ....................... H04W 72/02 |
| 2017/0332192 A1* | 11/2017 | Edge | ........................ H04W 4/02 |

* cited by examiner

COMMUNICATING LOCATION TRACKING INFORMATION BASED ON ENERGY CONSUMPTION ASPECTS

CROSS REFERENCE TO RELATED PATENTS

The present U.S. Utility Patent Application claims priority pursuant to 35 U.S.C. § 120 as a continuation of U.S. Utility application Ser. No. 15/967,258, entitled "COMMUNICATING LOCATION TRACKING INFORMATION BASED ON A PLURALITY OF LOCATING CATEGORY OPTIONS", filed Apr. 30, 2018, allowed, which is a continuation of U.S. Utility application Ser. No. 15/829,730, entitled "ESTABLISHING LOCATION TRACKING INFORMATION BASED ON A PLURALITY OF LOCATING CATEGORY OPTIONS," filed Dec. 1, 2017, now U.S. Pat. No. 9,980,087, issued on May 22, 2018, which claims priority pursuant to 35 U.S.C. § 120 as a continuation-in-part of U.S. Utility application Ser. No. 15/630,718, entitled "SYNCHRONIZING LOCATION STATUS INFORMATION IN A COMPUTING SYSTEM," filed Jun. 22, 2017, which claims priority pursuant to 35 U.S.C. § 119(e) to U.S. Provisional Application No. 62/354,523, entitled "SYNCHRONIZING LOCATION STATUS INFORMATION IN A COMPUTING SYSTEM," filed Jun. 24, 2016, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to development of location context information for utilization by location driven functions of the computing systems.

Description of Related Art

The use of location information by location driven functions of computing systems is well known, where location information includes one or more of an absolute location (e.g., a global positioning system (GPS) derived location) and a relative location (e.g., with respect to a known location). Location driven functions include a wide variety of applications including navigational aids (e.g., routes for driving, bicycling, walking, etc.), service delivery aids (e.g., vehicle route optimization, schedule adherence, etc.), retail shopping aids (e.g., proximity of available product, etc.), and safety and security aids (e.g., motorist assist, personal assist, asset tracking, people tracking, etc.).

The computing systems are known to include computing devices. Examples of the computing devices includes a smart phone, a tablet computer, a laptop computer, a vehicular computing device, a data storage server, and a data processing server. Basically, any device that includes a computing unit, one or more interfaces, and a memory system may be deemed as a computing device.

As is further known, the computing devices may be utilized to obtain location information associated with a particular computing device. In a self-determination approach, a computing device may determine location information associated with the computing device. In an assisted-determination approach, other computing devices may determine the location information associated with the computing device.

The self-determination approaches include receiving GPS signals and determining the location information, mapping received Wi-Fi hotspot identifiers to produce the location information, and mapping received Bluetooth beacon identifiers to produce the location information. The assisted-determination approaches include receiving wireless signals from the computing device (e.g., cellular, Wi-Fi, radiofrequency identifier (RFID) tag, Bluetooth, etc.) and analyzing the wireless signals utilizing a signal analysis approach. Signal analysis approaches include time of arrival, time difference of arrival, relative signal strength, triangulating utilizing a plurality of received wireless signals, and analysis of wireless network registration and site handover information (e.g., cellular site registration, cellular signal and timing metrics, Wi-Fi hotspot affiliation, etc.)

The location determining approaches are known to be associated with particular geographic regions and limitations. Examples of the geographic regions includes outdoors-centric with limited indoors and in-vehicle availability (e.g., GPS, other satellite-based location systems) and indoors-centric with limited location accuracy and limited availability (e.g., proximity to one or more Wi-Fi hotspots or Bluetooth beacons). Despite advances in location technologies, it is widely recognized that there is not a single location technology to fit all applications (e.g., broad coverage of all geographic regions of interest).

It is well-known that communication of the location information to the location driven functions may be carried out by an associated communication technology and/or an adjunct communication technology. For example, a Wi-Fi message is the associated communication technology when the Wi-Fi hotspot identifier is utilized to produce the location information. As another example, a cellular communication system message is the adjunct communication technology when the GPS signals are utilized to produce the location information. Despite advances in communication technology, it is widely recognized that there is not a single communication technology to provide the communication of the location information in light of other desires beyond the communication of the location information (e.g., battery life of a portable computing device, network charges, equipment costs, indoor vs. outdoors, etc.).

BRIEF DESCRIPTION OF THE SEVERAL VIEWS OF THE DRAWING(S)

DETAILED DESCRIPTION OF THE INVENTION

Figure 1A:
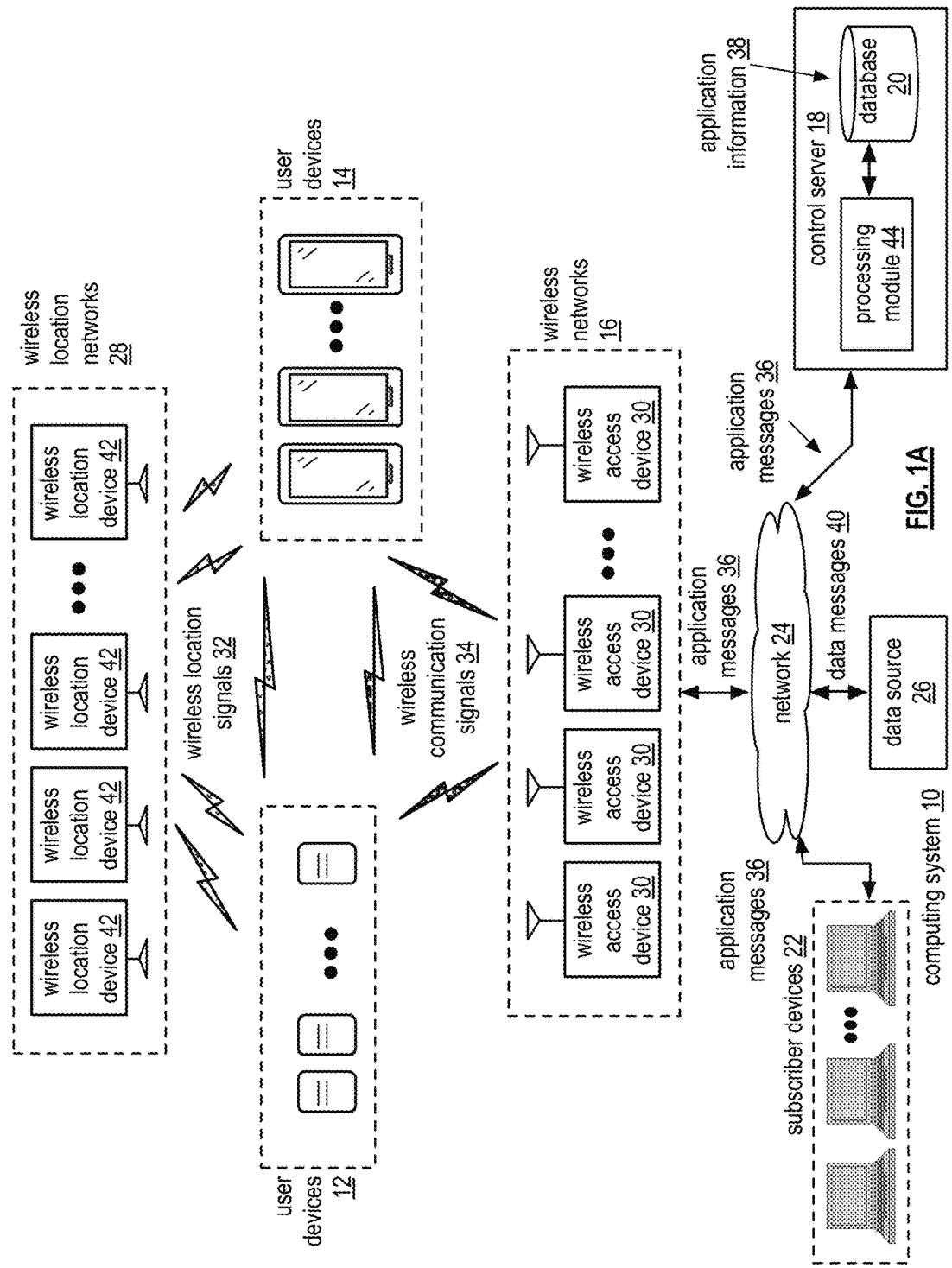
FIG. 1A is a schematic block diagram of an embodiment of a computing system in accordance with the present invention.

FIG. 1A is a schematic block diagram of an embodiment of a computing system 10 that includes wireless location networks 28, user devices 12, user devices 14, a wireless network 16, a control server 18, subscriber devices 22, a network 24, and a data source 26. The wireless location networks 28 include a plurality of wireless location devices 42 that communicate wireless location signals 32 with the user devices 12 and 14. Each wireless location device 42 may be implemented utilizing one or more of a portion of a global positioning system (GPS) satellite constellation, a portion of a private location service, a wireless local area network (WLAN) access point, a Bluetooth (BT) beacon and/or communication unit, and a radiofrequency identifier (RFID) tag and/or transceiver. Each wireless location device 42 generates and transmits the wireless location signals 32 in accordance with one or more wireless location industry standards (e.g., including synchronize timing information (i.e., GPS), and a geographic reference identifier (ID) (i.e., a beacon ID, a media access control (MAC) address, an access point ID such as a wireless local area network service set identifier (SSID)).

The user devices 12 includes one or more user devices 12, where each user device 12 may be implemented utilizing one or more portable computing devices. Examples of portable computing devices include an embedded clothing package, an asset tracking package, a computer dongle, embedded vehicular electronics, a smart phone, a tablet computer, a laptop, a handheld computer, and/or any other device that includes a computing core and is capable of operating in a portable mode untethered from a fixed and/or wired network. For example, a particular user device 12 is implemented utilizing the embedded clothing package, where the embedded clothing package is designed for ease of use within clothing (e.g., small size, lightweight, etc.). At least some of the user devices 12 may be capable to transmit the wireless location signals 32 to other user devices 12 and/or to at least some of the user devices 14.

The user devices 14 includes one or more user devices 14, where each user device 14 may be implemented utilizing one or more portable computing devices. For example, a particular user device 14 is implemented utilizing the smart phone, where the smart phone is designed for a wide variety of functionality (e.g., medium size, battery capacity to supply a color display and frequent wireless communications, etc.). At least some of the user devices 14 may be capable to transmit the wireless location signals 32 to the user devices 12 and/or to other user devices 14.

The wireless network 16 includes a plurality of wireless access devices 30. Each wireless access device 30 may be implemented utilizing one or more of a portion of a wireless communication network. Each wireless communications network includes one or more of a public wireless communication system and a private wireless communication system and may operate in accordance with one or more wireless industry standards including universal mobile telecommunications system (UMTS), global system for mobile communications (GSM), long term evolution (LTE), wideband code division multiplexing (WCDMA), and IEEE 802.11. For example, a first wireless access device 30 is implemented utilizing a base station of a LTE cellular network and a second wireless access device 30 is implemented utilizing a wireless LAN access point.

Each wireless access device 30 sends wireless communications signals 34 to the user devices 12 and 14 and receives wireless communications signals 34 from the user devices 12 and 14 to communicate application messages 36. The wireless communication signals 34 includes encoded forms of application messages 36 in accordance with the one or more wireless industry standards. The application messages 36 includes instructions and/or data associated with one or more location driven functions to be processed by one or more computing devices of the computing system 10. The user devices 12 and 14 may send and receive the wireless communications signals 34 directly between two or more user devices 12 and 14.

The components of the computing system 10 are coupled via the network 24, which may include one or more of wireless and/or wireline communications systems, one or more private communications systems, a public Internet system, one or more local area networks (LAN), and one or more wide area networks (WAN). For example, the network 24 is implemented utilizing the Internet to provide connectivity between the wireless network 16, the subscriber devices 22, the data source 26, and the control server 18.

The control server 18 includes at least one processing module 44 and a database 20. The processing module 44 processes the application messages 36 and manages storage of current and historical application information 38 within the database 20. The application information includes one or more of user account information, user device recommendations, user device configuration information, and user device status information (e.g., information associated with one or more user devices 12 and 14). The user account information includes one or more of IDs, permissions, affinity relationships of individuals and groups, and privacy requirements. The user device recommendations include one or more of a location synchronization approach, a location determination approach, and a communications path approach (e.g., requirements, recommended identifiers of computing devices associated with wireless communication, recommended power levels, recommended paths).

The user device configuration includes one or more of a reporting mode (e.g., autonomous, when requested, by exception, scheduled), reporting triggers, location format, status type reporting, required sensor data, wireless network list, other user device list, a wireless location network list, power consumption goals, backhaul assist limits for others, landmark information, geographic fence information, affiliated user device identifiers, etc. The user device status information (i.e., status information) includes one or more of a user ID, a user device ID, a location (e.g., absolute, relative, coordinates, address, etc.), an availability level, a user device battery remaining energy level, an average power consumption level, a schedule adherence indicator, a health indicator, and an emergency indicator.

Storing and processing application information 38 allows the processing module 44 to establish rules for each user device 12 or 14 of the computing system 10 via machine learning (i.e., analyzing application information and user device actions for patterns), interpreting sensor context, user device overrides and/or manual settings.

The subscriber devices 22 includes one or more subscriber devices 22, where each subscriber device 22 may be implemented utilizing one or more of a portable computing device and a fixed computing device (e.g., a desktop computer, a cable television set-top box, an application server, an internet television user interface and/or any other fixed device that includes a computing device). Such a portable or fixed computing device may include one or more of a computing core (e.g., providing processing module functionality), one or more wireless modems, sensors, and one or more user interfaces. The subscriber device 22 communicates application messages 36 with the control server 18 and one or more of the user devices 12 and 14. For example, the subscriber device 22 obtains and processes the status information from the user device 12.

The data source 26 may be implemented utilizing one or more of a server, a subscription service, a website data feed, or any other portal to data messages 40 that provide utility for synchronization of the status information between the user device 12 and the subscriber device 22. Examples of the data source 26 includes one or more of a weather service, a screen scraping algorithm, a website, another database, a schedule server, a live traffic information feed, an information server, a service provider, and a data aggregator. The data messages 40 include one or more of weather information, a user daily activity schedule (e.g., a school schedule, a work schedule, a delivery schedule, a public transportation schedule), real-time traffic conditions, a road construction schedule a community event schedule, and other schedules associated with a user.

In general, and with respect to the synchronizing of status information between the user device 12 and the subscriber device 22 (e.g., providing current status information of the user device 12 within a desired time frame to the subscriber device 22), the computing system 10 supports four primary functions. The four primary functions include determining an approach to the synchronizing of the status information (e.g., determining a location synchronization approach, determining a location determination approach), generating the status information (e.g., generating status information based on manually created, sensor context created, and/or machine learned rules; generating status information from a triggered response (e.g., motion detection, sharp barometer changes, etc.); determining a current location of the user device 12; and generating location synchronization information as the status information to include the current location), identifying a communication path to communicate the status information from the user device 12 to the subscriber device 22, and communicating the status information from the user device 12 to the subscriber device 22 utilizing the communication path.

The first primary function includes the computing system 10 determining the approach to synchronize the status information. In an example of operation of the determining the approach to synchronize the status information, the user device 12 obtains a location synchronization approach. The location synchronization approaches include performing regularly scheduled updates, by exception (i.e., off schedule, outside of a particular geographic region, movement, motion pattern trigger, emergency trigger), transport mode (i.e., walk, bicycle, car, air), when in proximity to a waypoint, when in proximity, or not, to a particular assisting entity (i.e., a user device 14 that can help with location determination and communication), upon request, when a location determination approach exceeds a high threshold level of expected performance (i.e., very low power required to gather and report location), proximity to other known user devices 12. The obtaining of the location synchronization approach may be based on one or more of a predetermination, guidance from the subscriber device, a current location, a current status of the user device 12 (e.g., needs help, normal).

For example, the user device 12 determines to synchronize the status information when detecting an unfavorable schedule adherence (e.g., a current location is ahead or behind a predetermined schedule). As another example, user devices 14 determine that the status information (e.g., time of day, day of week) stored locally on a user device 12 indicates a current status of "normal" (e.g., the user is a child at school at 2 PM on Monday). User devices 14 may share this "normal" status with subscriber device 22 without the user device 12 expending power to report back to subscriber device 22. As another example, user device 12 detects Wi-Fi signals indicating that a particular location is considered "safe" and/or "normal" (e.g., the user is a child at school at 2:00 PM on Monday) thus no location updates or synchronizations are triggered. If, for example, the user device 12 detects that the location is no longer "safe" and/or "normal" (e.g., the child is now at school at 3:45 PM on Monday which is 15 minutes past the "normal" time range) the user device 12 will initiate an approach to synchronize the status information with subscriber device 22. Alternatively, the processing module 44 determines the approach to synchronize the status information.

Having obtained the location synchronization approach, the user device 12 obtains a location determination approach. The location determination approach includes one or more of autonomously determining a current location, facilitating an assisted approach utilizing other computing devices of the computing system 10, one or more technology types (e.g., GPS, SSID, beacon, MAC address), and utilizing a last known location. The obtaining may be based on one or more of the location synchronization approach, availability of one or more location assets (e.g., to assist), requirements of the location determination approach (e.g., accuracy level, relative location versus absolute location, power requirements, priority level), a predetermination, and interpretation of guidance from the subscriber device 22, and selecting an approach that produces location information most favorably in accordance with the requirements. For example, the user device 12 determines to utilize GPS location information from a user device 14 when detecting proximity of the user device 14 and where the user device 14 generates acceptable location information. Alternatively, the processing module 44 determines the location determination approach.

The second primary function includes the computing system 10 generating the status information. In an example of operation of the generating of the status information, the user device 12 interprets wireless location signals 32 from the wireless location networks 28 to produce an absolute location associated with the user device 12 (e.g., a GPS-based location), interprets a user input to produce a status associated with a user of the user device (e.g., I'm okay pushbutton), and produces the status information to include the status associated with the user and/or the absolute location associated with the user device. As another example, the user device 12 interprets at least one of a wireless location signal 32 from a user device 14 and a wireless communication signal 34 from the user device 14 to produce a relative location association between the user device 14 and with the user device 12 (e.g., within a Bluetooth and/or Wi-Fi range proximity of the user device 14, based on signal strength, an absolute GPS location of the user device 14), interprets the user input to produce the status associated with the user, and produces the status information to include the status associated with the user and/or the relative location.

As yet another example of the generating of the status information, the user device 12 interprets another wireless location signal 32 from a wireless location device 42 to produce a relative location associated with the wireless location device 42 (e.g., within a Wi-Fi range proximity of the wireless location device 42, and absolute location of the wireless location device 42 based on interpreting a Wi-Fi mapping), interprets the user input to produce the status associated with the user, and produces the status information to include the status associated with the user and the relative location of the wireless location device 42. Alternatively, or in addition to, the user device 12 may utilize wireless location signals 32 from a plurality of wireless location devices 42 and user devices 14 to produce the status information. For example, the user device 12 receives a wireless communication signal 34 from a first user device 14, receives a wireless communication signal 34 from a second user device 14, receives another wireless communication signal 34 from a third user device 14, and estimates an absolute location of the user device 12 based on the received signals (e.g., triangulate).

The third primary function includes the computing system 10 identifying the communication path to synchronize the status information. In an example of operation of the identifying the communication path, the user device 12 identifies the communication path for communication of the status information (e.g., including the location synchronization information) to each of one or more synchronization entities (i.e., to one or more subscriber devices and/or user devices 14 either directly or via one or more intermediate communication nodes). Examples of the communication path include direct from the user device 12 to a wireless access device 30, and indirect via one or more user devices 14 and/or one or more other user devices 12 (e.g., a temporary mesh network).

The identifying of the communication path includes one or more of identifying the synchronization entities (i.e., via a list, interpreting a query response), identifying other user devices 12 to aggregate location synchronization information, interpreting a communication path test result, interpreting path history (e.g., a last utilized communication path), identifying preferred intermediate communication nodes (e.g., a series of user devices 12), estimating required costs (e.g., wireless network 16) and/or power requirements for each of one or more identified paths (e.g., potential battery remaining energy level degradation for the user device 12, other user devices 12, and one or more user devices 14), determining a communication path status (i.e. active/inactive), generating a ranking of the one or more identified communication paths based on requirements of the communications path (e.g., select a highest ranked communications path with regards to matching requirements). For example, the user device 12 identifies another user device 12 with a higher level of remaining stored battery energy to serve as an intermediate node, and identifies a user device 14 within wireless communication signals range of the other user device 12, where the user device 14 is favorably operably coupled via wireless communication signals 34 to a wireless access device 30, and where the wireless access device 30 is actively operably coupled to the control server 18 and to a subscriber device 22 via the network 24. As another example, the user device 12 identifies another user device 14 within wireless communication signals range of the user device 12, where the user device 14 indicates that user device 14 is identified to aggregate status information from device 12 and at least one other user device 12 for communication of the aggregated status information via wireless communication signals 34 to the wireless access device 30 etc.

The fourth primary function includes the computing system 10 communicating the status information. In an example of operation of the communicating the status information, the user device 12 facilitates, for each synchronization entity, communication of the location synchronization information utilizing an identified associated communication path in accordance with the location synchronization approach. The facilitating includes one or more of generating an application message 36 for encoding utilizing wireless communication signals 34, where the application message 36 includes one or more of an identifier of the user device 12, location coordinates, a location address, a geographic location identifier, an identifier of a wireless location device, and an identifier of an associated user device 14; and transmitting the wireless communication signals 34 in accordance with the associated communication path synchronization entity (e.g., to the user device 14, forwards to the wireless access device 30, forwards to the subscriber device 22, and may replicate the application message to send the replicated application message to the control server 18). Having received the status information including the location securitization information, the subscriber device 22 may display the status information. Alternatively, or in addition to, when receiving the application message 36, the processing module 44 stores the status information with a timestamp as application information 38 in the database 20.

Alternatively, or in addition to, the subscriber device 22 facilitates storing of application information including one or more of the user account information, the user device recommendations, and the user device configuration in the database 20. For example, the subscriber device 22 identifies a particular user device 12 for association with the subscriber device 22, establishes privacy requirements (e.g., restrictions on communicating status information), identifies a plurality of user devices 14 associated with trusted watchers (e.g., users of the user devices 14 with an affiliation with the particular user device 12, i.e., family members of a child associated with the user device 12), a desired number of days of battery life between recharging (i.e., power requirements), a daily schedule (i.e., a school schedule and after school schedule associated with the child), and an indication to synchronize the status information upon exceptions to the school and afterschool schedules as the location synchronization approach. Having updated the database 20, the processing module 44 may transmit a portion of the updated database 20 to the user device 12 to facilitate operation of the user device 12 utilizing one or more elements of the application information.

Figure 1B:
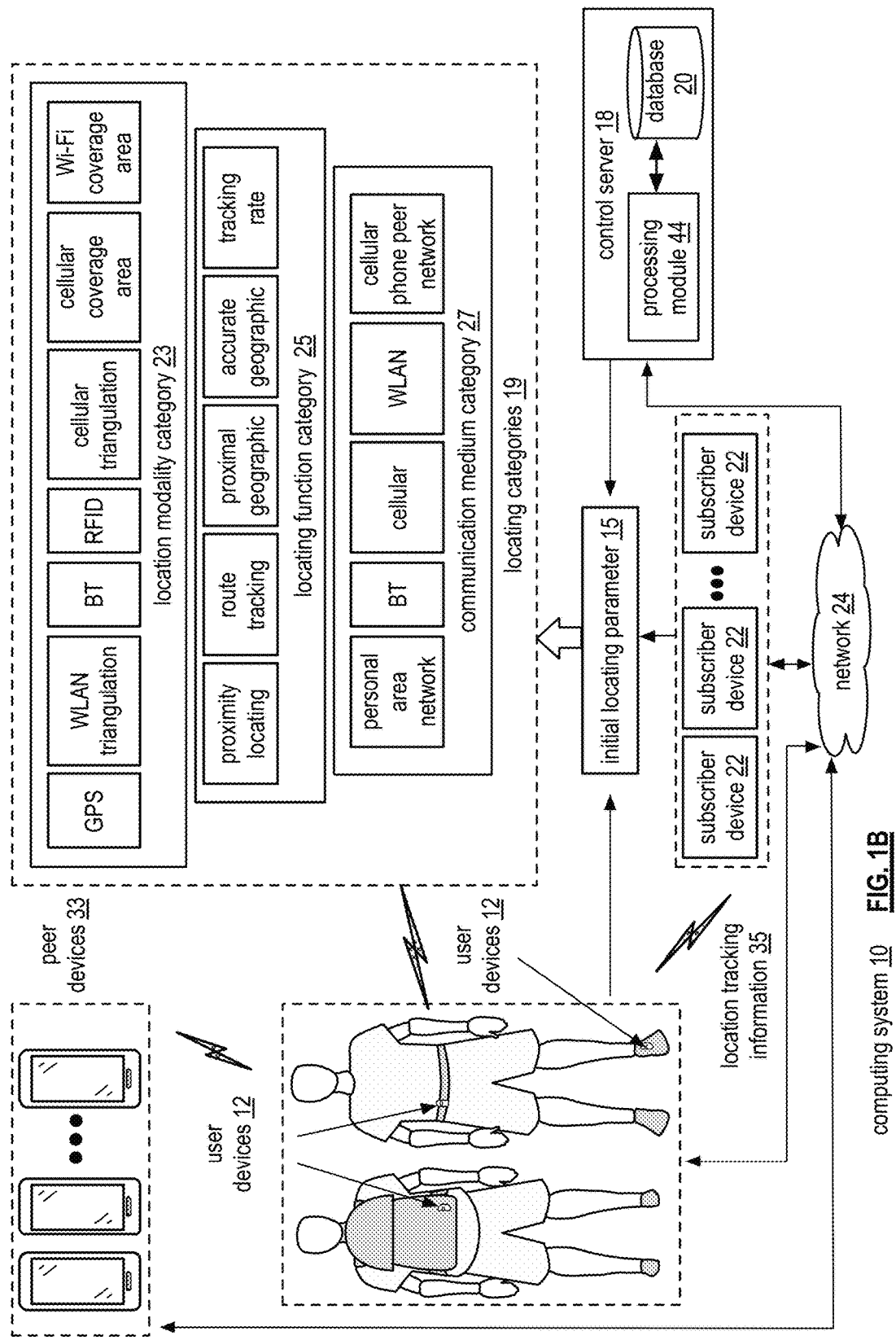
FIG. 1B is a schematic block diagram of another embodiment of a computing system in accordance with the present invention.

FIG. 1B is a schematic block diagram of another embodiment of a computing system 10 that includes user devices 12, control server 18, a plurality of locating categories 19, subscriber devices 22, network 24, and peer devices 33. The locating categories 19 include various locating category options for creating and/or establishing location tracking information 35 regarding user devices 12 affiliated with a person, persons, an item, and/or items and communicating that information to one or more subscriber devices 22.

The locating categories 19 includes a location modality category 23 (e.g., various location tracking technologies that may be available and/or desirable), a locating function category 25 (e.g., a desired degree and/or rate of tracking), and a communication medium category 27 (e.g., various mechanisms for communicating tracking information to subscriber devices 22). Each of the locating categories 19 includes a plurality of locating category options. The location modality category 23 includes the locating category options of global positioning system (GPS), wireless local area network (WLAN), cellular triangulation, cellular coverage area, Wi-Fi coverage area Bluetooth (BT), and radio frequency identification (RFID). The locating function category 25 includes the locating category options of proximity locating, route tracking, proximal geographical locating, accurate geographical locating, and tracking rate (e.g., periodic tracking, continuous tracking, etc.). The communication medium category 27 includes the locating category options of personal area networks, BT, cellular, WLAN, and cellular phone peer network.

User devices 12 are small, portable computing devices capable of tracking the location of an object and/or person it is associated with. For example, user devices 12 are small, lightweight devices (e.g., less than 2 inches by 2 inches by 1 inch and weighs less than a pound) that can be easily attached to or embedded into clothing and accessories (e.g., shoes, backpack, keychain, belt, etc.) or other objects (e.g., packages, items of value, etc.). As a specific example, a parent may wish to track the location of his or her child while the child is on the way to school, at school, and/or on the way home from school. To track these locations, the parent attaches user device 12 to the child such as on the child's backpack, belt, or shoe.

Subscriber devices 22 are computing devices that are associated with user(s) desiring to monitor the object(s) and/or person(s) associated with user devices 12. For example, a subscriber device 22 may be associated with a parent who wishes to track the location of his or her child via a user device 12 that is attached to the child in some way. Subscriber devices 22 may be implemented utilizing one or more of a portable computing device (e.g., a smart phone, a tablet computer, a laptop, a handheld computer, and/or any other device that includes a computing core and is capable of operating in a portable mode untethered from a fixed and/or wired network) and a fixed computing device (e.g., a desktop computer, a cable television set-top box, an application server, an internet television user interface and/or any other fixed device that includes a computing core). Such a portable or fixed computing device may include one or more of a computing core (e.g., providing processing module functionality), one or more wireless modems, sensors, and one or more user interfaces.

Peer devices 33 are portable computing devices that are trusted by the users of user devices 12 and can communicate via a wireless personal area network. For example, a wireless personal area network interconnects a peer device 33 (e.g., a cell phone) with a user device 12 and/or another peer device 33 via a Bluetooth (BT) link, a 60 GHz link, or other close proximity wireless protocol. Peer devices 33 may be implemented utilizing one or more portable computing devices. For example, peer devices 33 include one or more of a smart phone, a tablet computer, a laptop, a handheld computer, and/or any other device that includes a computing core and is capable of operating in a portable mode untethered from a fixed and/or wired network. For example, a particular peer device 33 is implemented utilizing a smart phone, where the smart phone is designed for a wide variety of functionality (e.g., medium size, battery capacity to supply a color display and frequent wireless communications, etc.). At least some of the peer devices 33 are capable to transmit the wireless location signals of the user devices 12 to other peer devices 33, to a WLAN, and/or to a cellular network.

As discussed in reference to FIG. 1A, the control server 18 includes at least one processing module 44 and a database 20. The processing module 44 establishes rules for each user device 12 and peer device 33 via machine learning (i.e., analyzing user device actions and past behavior for patterns), interpreting sensor context, user device overrides and/or manual settings. The processing module 44 facilitates storage of historical location tracking information and user device 12/peer device 33 information (e.g., IDs, permissions, affinity relationships of individuals and groups, privacy requirements, user account information, user device 12 recommendations, user device 12 reporting modes (e.g., autonomous, when requested, by exception, scheduled), reporting triggers, status type reporting, required sensor data, wireless network list, a wireless location network list, power consumption goals, backhaul assist limits for others, landmark information, geographic fence information, availability levels, device battery remaining energy levels, device average power consumption levels, a user device 12 schedule adherence indicator, a user device 12 health indicator, and a user device 12 emergency indicator etc.) in database 20. User devices 12, peer devices 33, and subscriber devices 22 are connected to control server 18 via network 24 and are operable to download and periodically update the latest rules from the control server 18.

In an example of operation, subscriber device 22 (e.g., a device operated by a parent), user devices 12, and/or peer devices 33 determine to monitor the location of a user device 12 or a set of user devices 12 (e.g., devices associated with a child the parent seeks to monitor) based on the rules established by the control server 18, device initiation, and/or sensor data. For example, a control server 18 established rule indicates that when user device 12 leaves school (i.e., a designated "safe location") location tracking automatically begins so that subscriber devices 22 and/or peer devices 33 can view user device 12 return safely home. As another example, user device 12 manually indicates (e.g., via hitting an emergency button) that location tracking is desired. As a further example, subscriber device 22 requests location tracking during a particular event for which there is no location tracking rule established by the control server 18 (e.g., while at the mall, a crowded grocery store, etc.) As a further example, user device 12 sensor data initiates tracking.

When location tracking is desired, an initial locating parameter 15 is determined. The initial locating parameter 15 is an indication from subscriber devices 22, user device(s) 12, and/or established rules regarding locating user device(s) 12 that prioritizes at least one of a first locating category of the plurality of locating categories 19 and a first locating category option. For example, a subscriber device 22 operated by the parent may request accurate geographical tracking information of the child as the initial locating parameter 15. For instance, the child has not arrived home when he or she was expected and the parent wishes to know the exact location of the child for safety reasons. As another example, accurate geographical tracking information is initiated based on established rules (e.g., the control server 18 fails to receive a scheduled "check-in" from user device 12). Based on this initial locating parameter 15, the locating function category 25 is selected as the first locating category and the accurate geographical locating option of the locating function category 25 is selected as the first selected locating category option when available.

As another example, the user device(s) 12 may indicate that is currently only has connectivity via cellular phone peer network utilizing one or more peer devices 33. Based on this initial locating parameter 15, the communication medium category 27 is selected as the first locating category and the cellular phone peer network option of the communication medium category 27 is selected as the first selected locating category option when available.

As another example, the subscriber device 22 may determine that Bluetooth (BT) and/or WLAN tracking is available and/or the most desirable tracking while in a particular location (e.g., while at the mall). Based on this initial locating parameter 15, the location modality category 23 is selected as the first locating category and the Bluetooth (BT) and/or WLAN option of the location modality category 23 is selected as the first selected locating category option when available.

A second locating category option is then selected based on the first selected locating category option. For instance, when the accurate geographical locating option of the locating function category 25 is selected as the first selected locating category option, the second locating category option is selected to achieve accurate geographical tracking. For example, one or more of GPS, cellular triangulation, and WLAN triangulation would be selected from the location modality category 23 as the second selected locating category option where GPS would be prioritized among the three options.

As another example, when the cellular phone peer network option of the communication medium category 27 is selected as the first selected locating category option, the second locating category (location modality category 23) is limited to cellular modality options (e.g., cellular triangulation, proximity to the location of the peer cell phone, and/or cellular coverage area). Thus, one or more of cellular triangulation, proximity to the location of the peer cell phone, and cellular coverage area are selected as the second selected locating category option.

A third locating category is then selected based on at least one of the first selected locating category option and the second selected locating category option. For example, when the cellular phone peer network option of the communication medium category 27 is selected as the first selected locating category option and if both second selected locating category options are available (i.e., cellular triangulation and cellular coverage area are both available), one or more of proximity locating, route tracking, proximal geographical locating, tracking rate, and accurate geographical locating can be selected from the locating function category 25 as the third selected locating category option. If, however, only cellular coverage area is available, the options from the locating function category 25 are limited to one or more of proximity locating, route tracking, proximal geographical locating, and tracking rate.

When selections from all three locating categories are selected, location tracking information 35 is communicated from the user devices 12 to the subscriber devices 22 and/or peer devices (e.g., directly or via the control server 18 via network 24) based on the first, second, and third selected locating category options. For example, when the accurate geographical locating option of the locating function category 25 is selected as the first selected locating category option, the GPS option of the location modality category 23 is selected as the second selected locating category option, and cellular of the communication medium category 27 is selected as the third selected locating category option, the subscriber device 22 will receive accurate geographical location tracking information 35 achieved by GPS and communicated from the user device 12 to the control server 18 (or the subscriber device 22 directly) by cellular to make user device 12's location visible to all authorized watchers on demand or via a push.

As another example, user device 12 connects to peer device 33 via Bluetooth in order to use peer device 33's GPS functionality. Peer device 33 connects to the control server 18 (or subscriber device 22 directly) via cellular to make user device 12's location visible to all authorized watchers on demand or via a push. As another example, the accurate geographical locating option of the locating function category 25 is selected as the first selected locating category option, the GPS option of the location modality category 23 is selected as the second selected locating category option, and Bluetooth of the communication medium category 27 is selected as the third selected locating category option. For example, user device 12 connects to peer device 33 via Bluetooth in order to use peer device 33's GPS functionality. When peer device 33 is a trusted watcher, peer device 33 views the accurate geographical location tracking information 35 using its own GPS to monitor user device 12 via Bluetooth.

Figure 2:
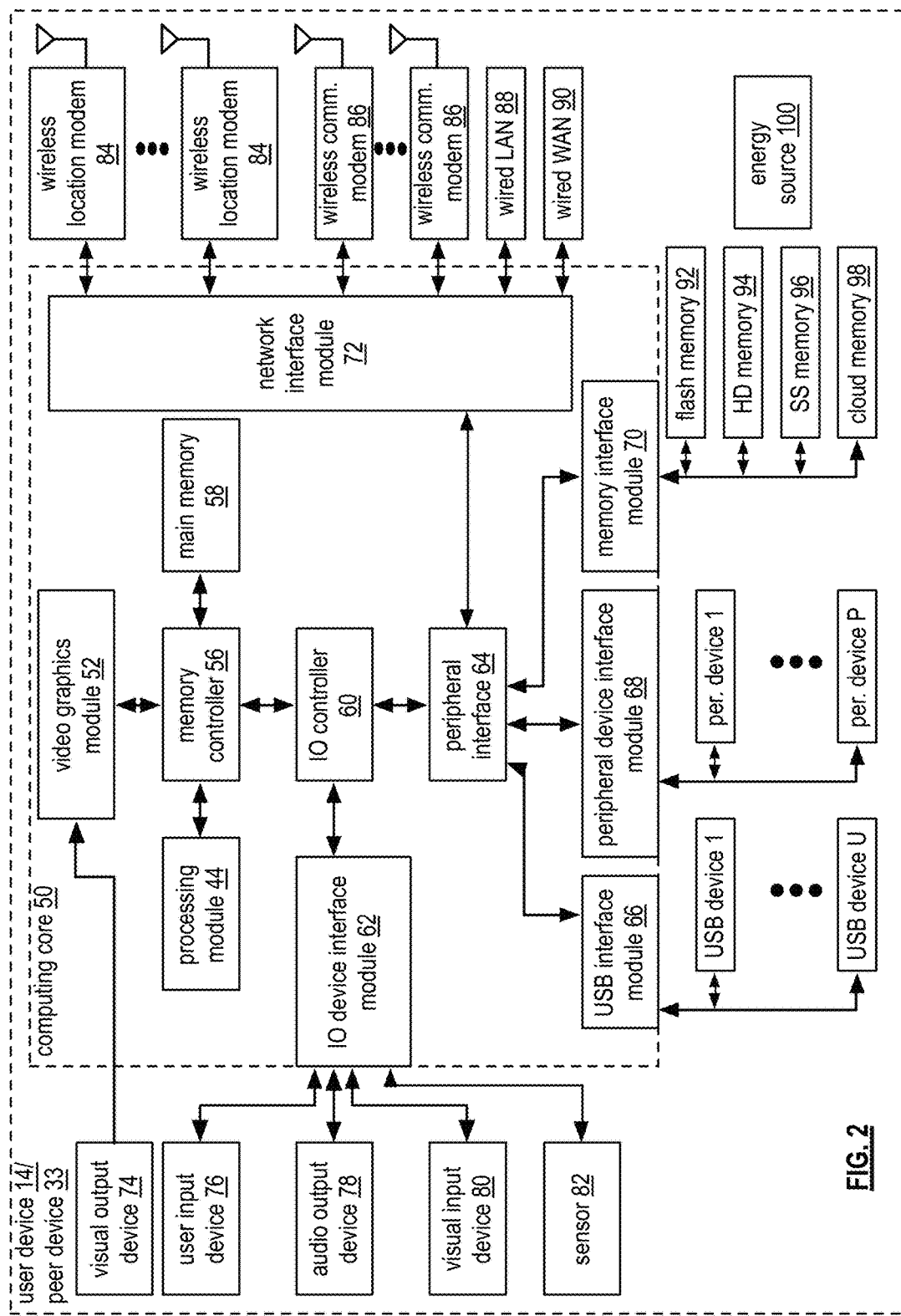
FIG. 2 is a schematic block diagram of an embodiment of user device of a computing system in accordance with the present invention.

FIG. 2 is a schematic block diagram of an embodiment of the user device 14/peer device 33 of the computing system 10 that includes a computing core 50, a visual output device 74 (e.g., a display screen, a light-emitting diode), a user input device 76 (e.g., keypad, keyboard, touchscreen, voice to text, etc.), an audio output device 78 (e.g., a speaker, a transducer, a motor), a visual input device 80 (e.g., a photocell, a camera), a sensor 82 (e.g., an accelerometer, a velocity detector, electronic compass, a motion detector, electronic gyroscope, a temperature device, a pressure device, an altitude device, a humidity detector, a moisture detector, an image recognition detector, a biometric reader, an infrared detector, a radar detector, an ultrasonic detector, a proximity detector, a magnetic field detector, a biological material detector, a radiation detector, a mass and/or weight detector, a density detector, a chemical detector, a fluid flow volume detector, a DNA detector, a wind speed detector, a wind direction detector, a motion recognition detector, and a battery level detector), one or more universal serial bus (USB) devices 1-U, one or more peripheral devices, one or more memory devices (e.g., a flash memory device 92, one or more hard drives 94, one or more solid state (SS) memory devices 96, and/or cloud memory 98), an energy source 100 (e.g., a battery, a generator, a solar cell, and a fuel cell), one or more wireless location modems 84 (e.g., a GPS receiver, a Wi-Fi transceiver, a Bluetooth transceiver, etc.), one or more wireless communication modems 86 (e.g., 4G cellular), a wired local area network (LAN) 88, and a wired wide area network (WAN) 90

The computing core 50 includes a video graphics processing module 52, one or more processing modules 44, a memory controller 56, one or more main memories 58 (e.g., RAM), one or more input/output (I/O) device interface modules 62, an input/output (I/O) controller 60, a peripheral interface 64, one or more USB interface modules 66, one or more network interface modules 72, one or more memory interface modules 70, and/or one or more peripheral device interface modules 68. Each of the interface modules 62, 66, 68, 70, and 72 includes a combination of hardware (e.g., connectors, wiring, etc.) and operational instructions stored on memory (e.g., driver software) that is executed by the processing module 44 and/or a processing circuit within the interface module. Each of the interface modules couples to one or more components of the user device 14. For example, one of the IO device interface modules 62 couples to an audio output device 78. As another example, one of the memory interface modules 70 couples to flash memory 92 and another one of the memory interface modules 70 couples to cloud memory 98 (e.g., an on-line storage system and/or on-line backup system).

The main memory 58 and the one or more memory devices include a computer readable storage medium that stores operational instructions that are executed by one or more processing modules 44 of one or more computing devices (e.g., the user device 14) causing the one or more computing devices to perform functions of the computing system 10. For example, the processing module 44 retrieves the stored operational instructions from the HD memory 94 for execution.

Figure 3:
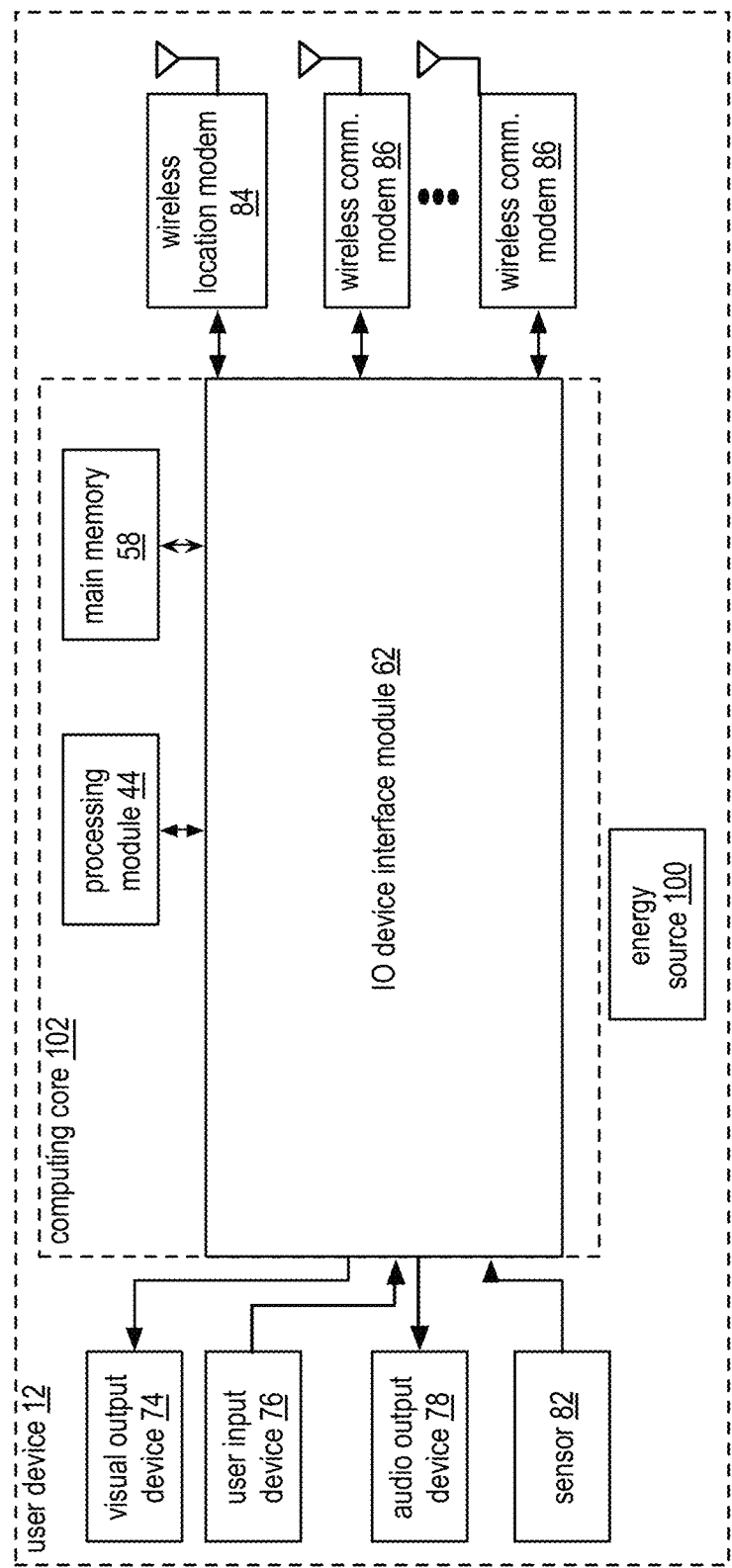
FIG. 3 is a schematic block diagram of another embodiment of user device of a computing system in accordance with the present invention.

FIG. 3 is a schematic block diagram of another embodiment of the user device 12 of the computing system 10 that includes a computing core 102, and elements of the user device 14 (e.g., FIG. 2), and may include one or more of the visual output device 74, the user input device 76, the audio output device 78, the sensor 82, the energy source 100, the wireless location modem 84, and the plurality of wireless communication modems 86. The computing core 102 includes the I/O device interface module 62 of FIG. 2, the main memory 58 of FIG. 2, and the processing module 44 of FIG. 2. The user device 12 may be constructed to provide functionality to determine and communicate the status information in a cost-effective and low-power way. For example, the visual output device 74 is implemented to include a multicolor LED, the user input device 76 includes a switch, the audio output device 78 includes APs electric speaker, the sensor 82 includes a motion sensor and a battery level detector, the energy source 100 includes small form factor rechargeable batteries, the wireless location modem 84 includes a low-power GPS receiver, a first wireless communication modem 86 includes a Wi-Fi transceiver, and a second wireless communication modem 86 includes a Bluetooth transceiver.

Figure 4:
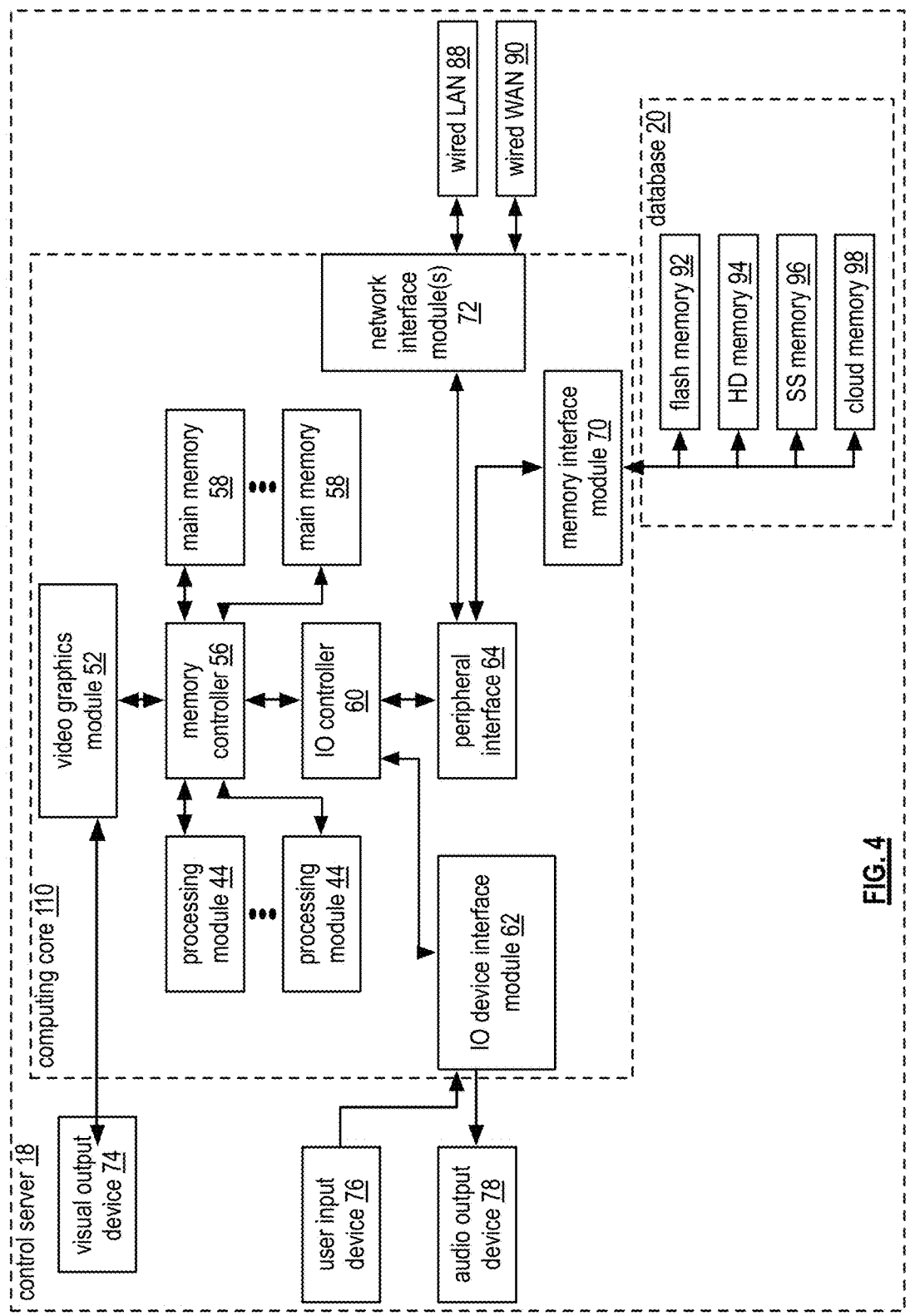
FIG. 4 is a schematic block diagram of an embodiment of a control server of a computing system in accordance with the present invention.

FIG. 4 is a schematic block diagram of an embodiment of the control server 18 of the computing system 10 that includes a computing core 110 and elements of the user device 14 (e.g., FIG. 2), including one or more of the visual output device 74, the user input device 76, the audio output device 78, the memories 92-98 to provide the database 20 of FIG. 1, the wired LAN 88, and the wired WAN 90. The computing core 110 includes elements of the computing core 50 of FIG. 2, including the video graphics module 52, the plurality of processing modules 44, the memory controller 56, the plurality of main memories 58, the input-output controller 60, the input-output device interface module 62, the peripheral interface 64, the memory interface module 70, and the network interface modules 72.

Figure 5:
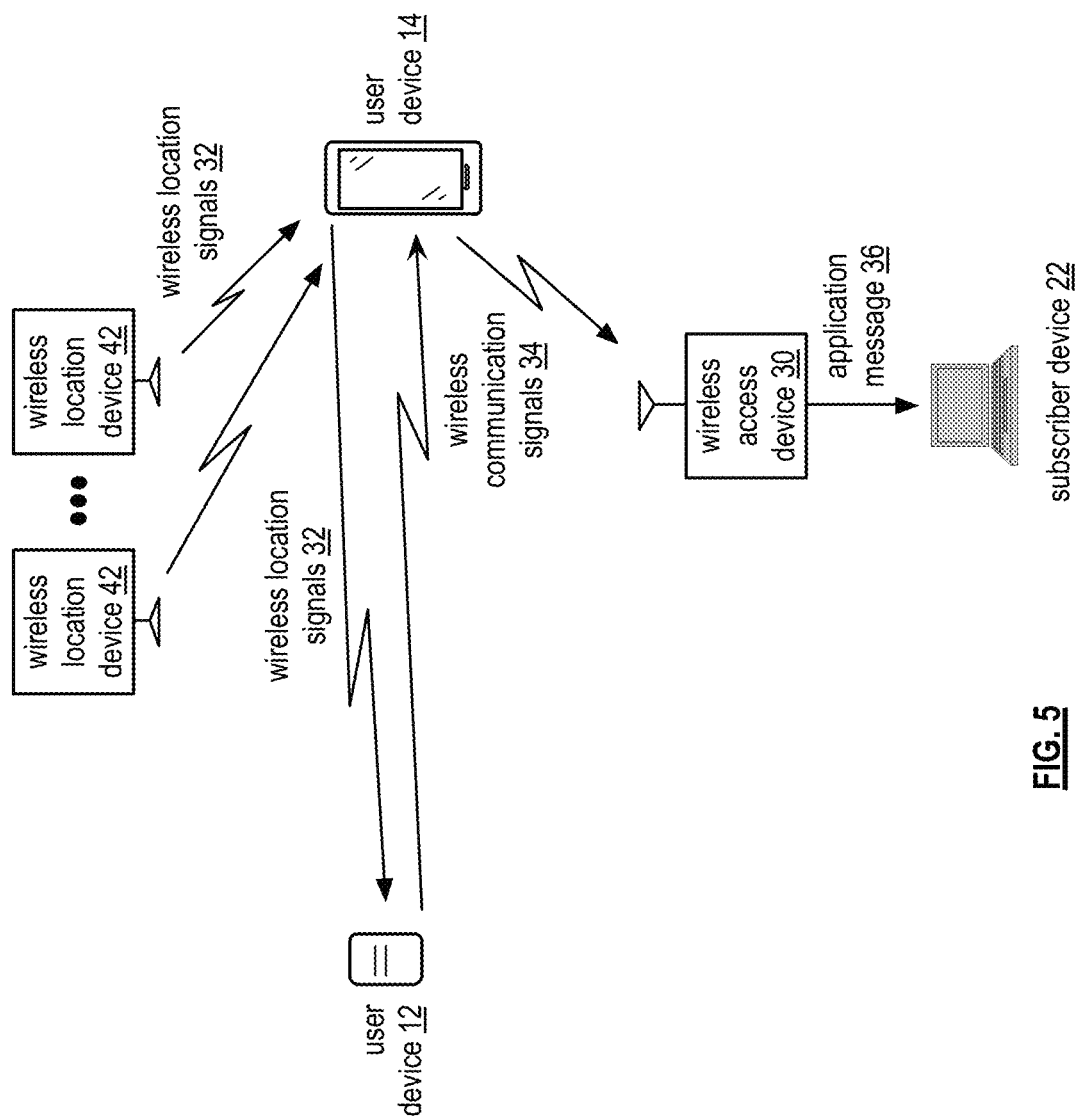
FIG. 5 is a schematic block diagram of another embodiment of a computing system in accordance with the present invention.

FIG. 5 is a schematic block diagram of another embodiment of a computing system that includes a plurality of wireless location devices 42 of FIG. 1A, the user device 12 of FIG. 1A, the user device 14 of FIG. 1A, the wireless access device 30 of FIG. 1A, and the subscriber device 22 of FIG. 1A. The computing system functions to synchronize location status information, associated with the user device 12, to the subscriber device 22.

In an example of operation of the synchronization, the user device 12 obtains a location synchronization approach (e.g., under what circumstances to report location and status). The obtaining includes one or more of utilizing a predetermination (e.g., a default configuration), utilizing guidance from the subscriber device 22 (e.g., in accordance with a message from one or more of the control server 18 and the subscriber device 22), determining the approach based on a current location (e.g., update more often when not at home or school), determining the approach based on detecting other affiliated user devices 12 and/or one or more affiliated user devices 14 and determining the approach based on a current status of a user associated with the user device 12 (e.g., normal status, needs help, etc.). For example, the user device 12 determines to synchronize location and status every 10 minutes when there are no detectable affiliated user devices 12 and determines to synchronize the location and status every hour when at least one other affiliated user device 12 is detected (e.g., another family member is nearby).

Having obtained the location synchronization approach, the user device 12 obtains a location determination approach based on availability of location assets (e.g., available location determination assistance from one or more user devices 14, from one or more other user devices 12, and whether a GPS wireless location device 42 is detectable) and based on the location synchronization approach. The obtaining includes one or more of determining the applicability of a particular location determination approach with regards to the location synchronization approach (e.g., a required frequency of providing location updates may be too often to accommodate a particular location determination approach associated with a lengthy process to produce a location), establishing wireless connectivity with the location assets (e.g., receiving wireless location signals 32, receiving wireless communication signals 34), determining whether a particular location asset is able to provide assistance in determining the location, obtaining location requirements (e.g., from configuration information, from the subscriber device 22), where the requirements include one or more of absolute versus relative, location accuracy, power requirements for the location determination, and a priority level; utilizing the predetermination, and selecting an approach from two or more identified approaches that produces the location most favorably in accordance with the requirements. For example, the user device 12 determines to utilize a GPS location of the user device 14 to lower energy consumption of the user device 12 when the location determination requirements include minimize energy consumption guidance and allow utilization of a location proxy of a nearby location asset.

Having produced the location determination approach, the user device 12 facilitates generating the location synchronization information utilizing the location determination approach. For example, the user device 12 receives wireless location signals 32 from the user device 14, where the wireless location signals 32 includes a Bluetooth beacon identifying the user device 14 and GPS coordinates associated with the user device 14, where the user device 14 receives wireless location signals 32 from a plurality of wireless location devices 42 (e.g., GPS satellite constellation) to produce the GPS coordinates. The generating of the location synchronization information may further include the user device 12 reading a user input device (e.g., a push button switch, a motion detector) associated with the user device 12 to capture a current status associated with a user of the user device 12. When utilizing the current status, the user device 12 aggregates the location information and the current status produce the location synchronization information.

Having generated the location synchronization information, the user device 12 identifies a communication path for communication of the location synchronization information to each of one or more synchronization entities (e.g., to the subscriber device 22 in accordance with configuration information). The identifying includes one or more of identifying the synchronization entities (e.g., from a list, based on one or more requests, in accordance with the configuration information), identifying location synchronization from at least one other user device 12 for aggregation (e.g., to save energy), interpreting a communication path test result (e.g., extracting latency, energy requirements, error rates, etc.), interpreting communication path history (e.g., which path was favorably utilized most recently), identifying preferred intermediate communication nodes for potentially relaying the location synchronization information (e.g., detecting one or more user devices 14, detecting a wireless access device 30, detecting one or more user devices 12, detecting a virtual mesh network), estimating costs (e.g., network charges) estimating energy requirements, determining a communication path status (e.g., active/inactive), obtaining communication path requirements (e.g., from the configuration information, based on available energy levels of one or more user devices, based on the location synchronization approach), generating a ranking of two or more communication paths measuring favorability of communication path attributes to the communication path requirements, selecting a highest ranked communication path or a first communication attempt (e.g., potential utilizing next ranked communication paths upon failure of a current communication attempt).

As an example of the identifying of the communication path, the user device 12 selects a communication path that includes transmitting a wireless communication signal 34 from the user device 12 to the user device 14, where the user device 14 forwards an updated wireless communication signal 34 to the wireless access device 30 for communication of an application message 36 (e.g., that includes the location synchronization information) to the subscriber device 22. Alternatively, the user device 12 identifies a next ranked communication path that includes sending wireless communication signals 34 directly from the user device 12 to the wireless access device 30 (e.g., although with a higher level of energy consumption).

Having produced the location synchronization information and having identified the communication path, for each synchronization entity (e.g., the subscriber device 22), the user device 12 facilitates communication of the location synchronization information to the synchronization entity using an identified associated communication path in accordance with the location synchronization approach (e.g., timed appropriately). For example, the user device 12 generates communication path instructions (e.g., details of the communication path), encodes the location synchronization information and the communication path instructions to produce wireless communication signals 34 (e.g., status, GPS accordance of the user device 14, an indicator that the location of the user device 14 is a proxy for the location of the user device 12, an identifier the user device 12, identifiers of intermediate nodes of the communication path), and transmits the wireless communication signals 34 to the user device 14 in accordance with the identified communication path, where the user device 14 decodes the wireless communication signals 34 to reproduce the location synchronization information and updates the location synchronization information (e.g., adds an identifier of the user device 14, updates the encapsulated GPS location of the user device 14, aggregates other location synchronization from other user devices 12 and/or user devices 14) and encodes the updated location synchronization information to produce further wireless communication signals 34 for transmission to the wireless access device 30. When receiving the wireless communication signals 34, the wireless access device 30 decodes the application message 36 that includes the updated location synchronization information and sends the updated location synchronization information to the subscriber device 22 for further processing and/or display.

Alternatively, or in addition to, the user device 12 identifies a particular communication path to include a branch, where the location synchronization information follows the path for a first portion and then is split into two different branches to communicate replicated location synchronization information to two or more synchronization entities. For example, the user device 12 encodes the location synchronization information and communication path instructions to produce the wireless communication signals 34, sends the wireless communication signals 34 to the user device 14, where the user device 14 sends the further wireless communication signals 34 that includes the updated location synchronization information to the wireless access device 30, where the wireless access device 30 interprets communication path instructions to replicate the updated location synchronization information and where the wireless access device 30 sends the updated location synchronization information to the subscriber device 22 and sends the replicated updated location synchronization information to the control server 18 for further processing and/or storage.

Figure 6:
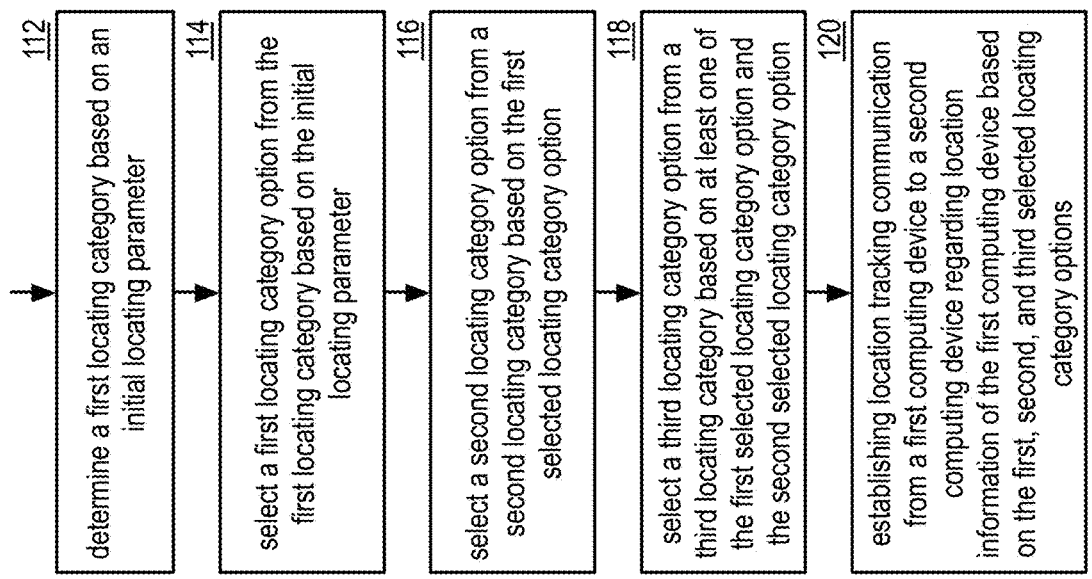
FIG. 6 is a logic diagram of an embodiment of a method of establishing location tracking information based on a plurality of locating category options in accordance with the present invention.

FIG. 6 is a logic diagram of an embodiment of a method of establishing location tracking information based on a plurality of locating category options. The method begins with step 112 where a first locating category of a plurality of locating categories is determined based on an initial locating parameter. The plurality of locating categories includes a location modality category, a locating function category, and a communication medium category. Each of the plurality of locating categories includes a plurality of locating category options.

The location modality category includes the locating category options of global positioning system (GPS), wireless local area network (WLAN), cellular triangulation, cellular coverage area, Wi-Fi coverage area, Bluetooth (BT), and radio frequency identification (RFID). The locating function category includes the locating category options of proximity locating, route tracking, proximal geographical locating, accurate geographical locating, and tracking rate. The communication medium category includes the locating category options of personal area networks, BT, cellular, WLAN, and cellular phone peer network. The initial locating parameter is an indication from one of a first and a second communication device and/or an indication based on rules established by the control server prioritizing at least one of the first locating category and the first selected locating category option. The first communication device is associated with a person or object for which monitoring location is desired (e.g., a child). The second communication device is affiliated with a person desiring to monitor the person or object for which monitoring location is desired (e.g., a parent).

For example, a second communication device may be affiliated with a parent that wishes to track a child's location with a first communication device. The parent may request accurate geographical tracking information as the initial locating parameter. For instance, the child has not arrived home when he or she was expected and the parent wishes to know the exact location of the child for safety reasons. As another example, based on rules established by the control server 18, accurate geographical tracking information is selected based on defined occurrences (e.g., the control server 18 fails to receive a scheduled "check-in" from user device 12). This initial locating parameter prioritizes the locating function category and the locating function category is selected as the first locating category.

The method continues with step 114 where a first locating category option is selected from the first category option based on initial locating parameter. Using the same example as above, based on accurate geographical tracking indicated as the initial locating parameter, the accurate geographical locating option of the locating function category is selected as the first selected locating category option when this option is available.

The method continues with step 116 where a second locating category option from a second locating category of the plurality of locating categories is selected based on the first selected locating category option to produce a second selected locating category option. Using the same example as above, when the accurate geographical locating option of the locating function category is selected as the first selected locating category option, the second locating category option is selected to achieve accurate geographical tracking. For example, one or more of GPS, cellular triangulation, and WLAN triangulation is selected from the location modality category as the second selected locating category option where GPS is prioritized among the three options.

When the second selected locating category is not available, it is determined whether one or more other second locating category options from the second locating category are available based on the first selected locating category option. For example, if GPS is not available as a second selected locating category option (e.g., the first communication device does not have GPS capability and is unable to use the GPS of a peer device), it is determined whether cellular triangulation and/or WLAN triangulation are available.

When the one or more other second locating category options are available, one or more of the one or more other second locating category options is selected as the second selected locating category option based on the first selected locating category option. For example, when GPS is unavailable as the second locating category option, but cellular triangulation and WLAN triangulation are, one or more of cellular triangulation and WLAN triangulation is selected as the second selected locating category option.

However, when the one or more other second locating category options are not available, the initial locating parameter is adjusted to prioritize another locating category option of the first locating category when one or more other first locating category options of the first locating category are available. For example, if GPS, cellular triangulation, and WLAN triangulation are not available, accurate geographical locating is no longer possible and the initial locating parameter must be adjusted. For example, when accurate geographical locating is not possible, the initial locating parameter is adjusted to prioritize proximal locating.

When another locating category option of the first locating category is available, one of the one or more first locating category options is selected as the first selected locating category option based on the adjusted initial locating parameter. For example, if the adjusted initial locating parameter is proximal locating, one or more of proximal geographical locating, proximal locating, and/or route tracking may be selected as the first selected locating category option.

If one or more other first locating category options of the first locating category are not available, the devices wait a predetermined amount of time for availability of the first selected locating category option. As an example, an initial locating parameter indicated that the first communication device currently only has connectivity via a cellular phone peer network. Cellular phone peer network is selected as the first selected locating category option from the communication medium category, and based on that selection, one or more of cellular triangulation and cellular coverage area are selected as the second selected locating category option from the location modality category. However, if cellular service drops out, the second selected locating category option as well as the first selected category option are unavailable. Because the first communication device previously only had connectivity via a cellular phone peer network prior to the outage, the devices wait a predetermined amount of time for cellular service to come back up or for another communication medium to become available (thus changing the initial locating parameter).

The method continues with step 118 where a third locating category option from a third locating category of the plurality of locating categories is selected based on at least one of the first selected locating category option and the second selected locating category option to produce a third selected locating category option. For example, when the accurate geographical locating option of the locating function category is selected as the first selected category option, and GPS is selected as the second selected locating category option (when available), one or more of personal area networks, BT, cellular, WLAN, and cellular phone peer network is selected as the third selected locating category option from the communication medium category.

The method continues with step 120 where location tracking communication is established from the first communication device to the second communication device regarding location information of the first communication device based on the first, second, and third selected locating category options. For example, when the accurate geographical locating option of the locating function category is selected as the first selected locating category option, the GPS option of the location modality category is selected as the second selected locating category option, and cellular of the communication medium category is selected as the third selected locating category option, the second communication device will receive accurate geographical location tracking information achieved by GPS from the first communication device and/or from the control server (e.g., the first communication device connects to the control server via cellular and the control server makes the first communication device's location visible to all authorized watchers) via cellular.

Figure 7:
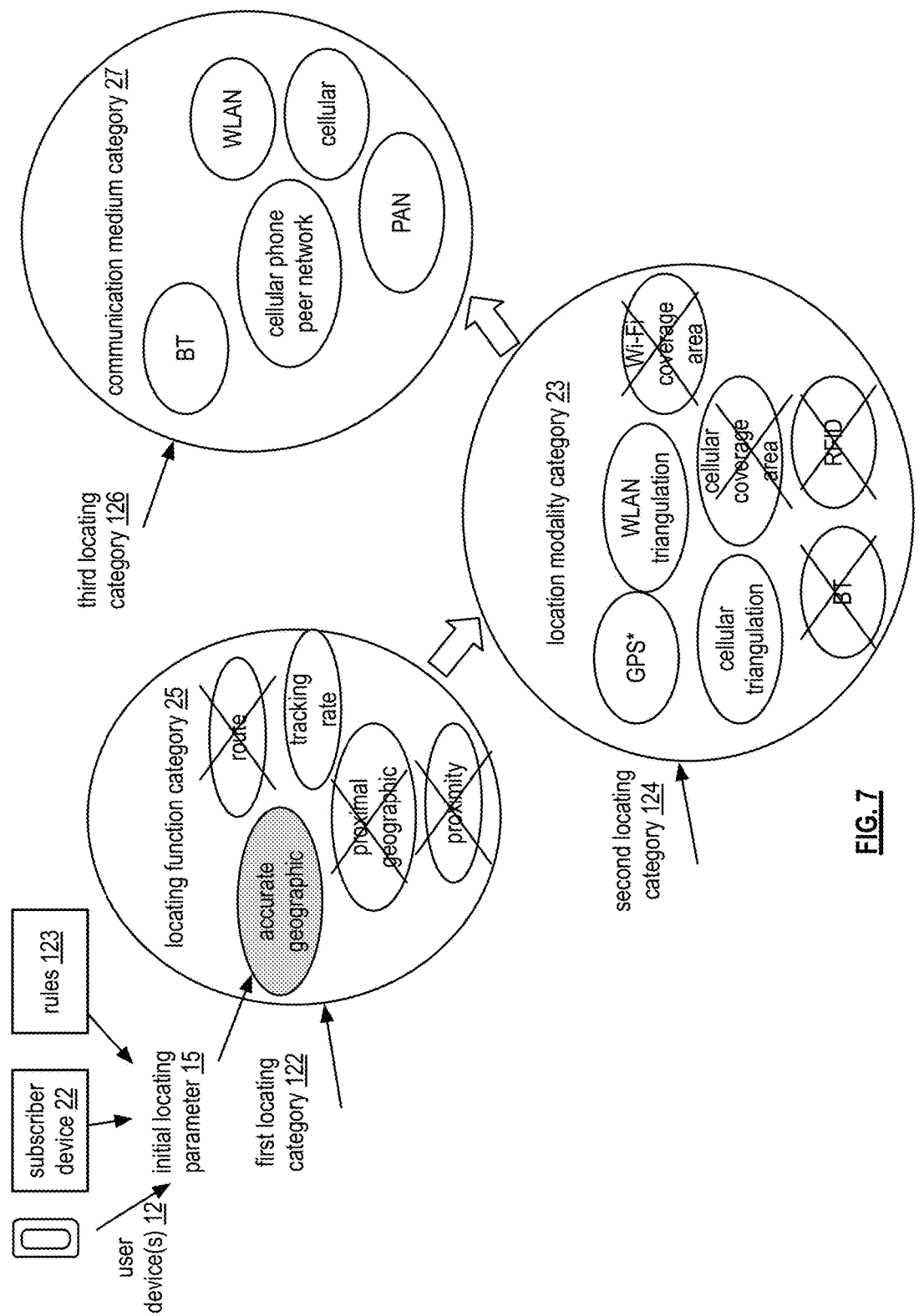
FIG. 7 is an example of selecting a plurality of locating category options in accordance with the present invention.

FIG. 7 is an example of selecting a plurality of locating category options. In this example, a subscriber device 22 is affiliated with a parent that wishes to track a child's location with user device 12. The parent (e.g., subscriber device 22)

requests accurate geographical tracking information as the initial locating parameter 15. For instance, the child has not arrived home when he or she was expected and the parent wishes to know the exact location of the child for safety reasons. As another example, based on rules 123 established by the control server, accurate geographical tracking information is selected based on defined occurrences (e.g., the control server fails to receive a scheduled "check-in" from user device 12). As another example, user device 12 indicates that accurate geographical tracking information is requested (e.g., the child hits an "emergency" button, user device 12 contacts a sensor that triggers accurate tracking, etc.). Based on this initial locating parameter 15, the locating function category 25 is selected as the first locating category 122. Accurate geographical locating is then selected from the locating function category 25 as the first selected locating category option when available. The subscriber device 22, user device 12, and/or rules 123 may also indicate a desired tracking rate (e.g., continuous tracking) as part of the first selected locating category option.

Because the accurate geographical locating option of the locating function category 25 is selected as the first selected locating category option, the second locating category option is selected to achieve accurate geographical tracking. For example, the location modality category 23 is selected as the second locating category 124. One or more of GPS, cellular triangulation, and WLAN triangulation are selected from the location modality category 23 as the second selected locating category option where GPS is prioritized among the three options. If none of these options are available, the subscriber device may have to adjust the initial locating parameter to prioritize another option (e.g., proximal tracking).

A third locating category option is then selected from the third locating category (the communication medium category 27) based on at least one of the first selected locating category option and the second selected locating category option to produce a third selected locating category option. Here, neither the first or second selected locating category option limit the selections from the communication medium category 27. Therefore, one or more of personal area networks (PAN), Bluetooth (BT), cellular, WLAN, and cellular phone peer network is selected as the third selected locating category option.

Figure 8:
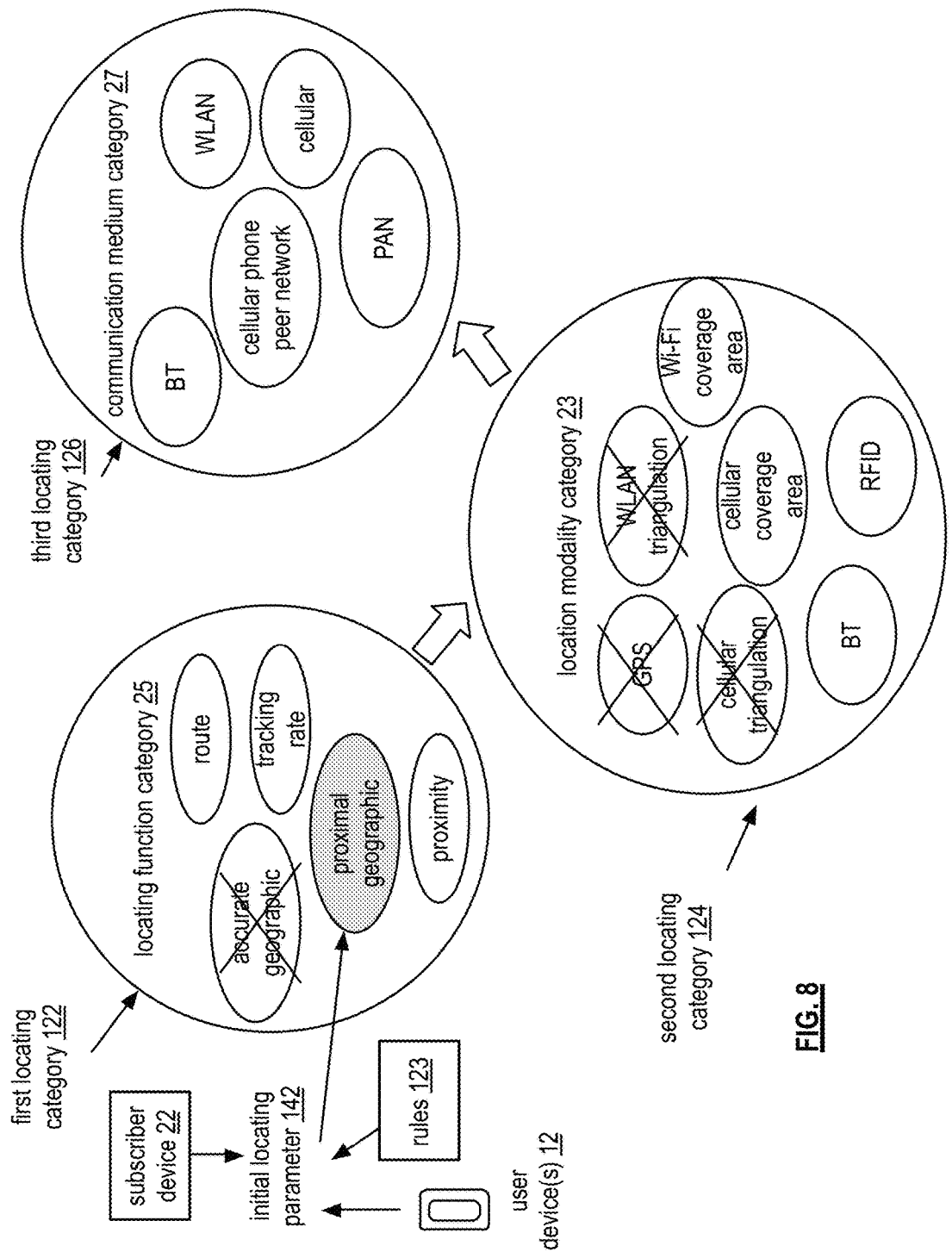
FIG. 8 is another example of selecting a plurality of locating category options in accordance with the present invention.

FIG. 8 is another example of selecting a plurality of locating category options. In this example, a subscriber device 22 is affiliated with a parent that wishes to track a child's location with user device 12. The parent requests proximal geographical tracking information as the initial locating parameter 142. For instance, the parent is interested in knowing whether the child is in a certain area (e.g., at school) but does not need to know an exact location. As another example, based on rules 123 established by the control server, proximal geographical tracking information is selected based on defined occurrences (e.g., the control server receives an update from user device 12 that user device 12 has arrived at a particular location that the subscriber device 22 has defined as an area to always provide proximal tracking information). As another example, user device 12 indicates that proximal geographical tracking information is requested (e.g., the child initiates tracking at a certain time based on a parent instruction, user device 12 contacts a sensor that indicates proximal tracking, etc.). Based on this initial locating parameter 142, the locating function category 25 is selected as the first locating category 122. Proximal geographical locating is then selected from the locating function category 25 as the first selected locating category option when available.

Because the proximal geographical locating option of the locating function category 25 is selected as the first selected locating category option, the second locating category option is selected to achieve proximal geographical tracking. For example, the location modality category 23 is selected as the second locating category 124. One or more of cellular coverage area, Wi-Fi coverage area, RFID, and Bluetooth (BT) are selected from the location modality category 23 as the second selected locating category option. For example, Wi-Fi coverage area is selected when available (e.g., a broad Wi-Fi MAC address or SSID can provide a proximal location without resorting to true triangulation). Modalities that are most useful for accurate tracking (e.g., GPS, WLAN triangulation, and cellular triangulation) are eliminated as options.

A third locating category option is then selected from the third locating category (the communication medium category 27) based on at least one of the first selected locating category option and the second selected locating category option to produce a third selected locating category option. Here, neither the first or second selected locating category option limit the selections from the communication medium category 27. Therefore, one or more of personal area networks (PAN), Bluetooth (BT), cellular, WLAN, and cellular phone peer network is selected as the third selected locating category option.

Figure 9:
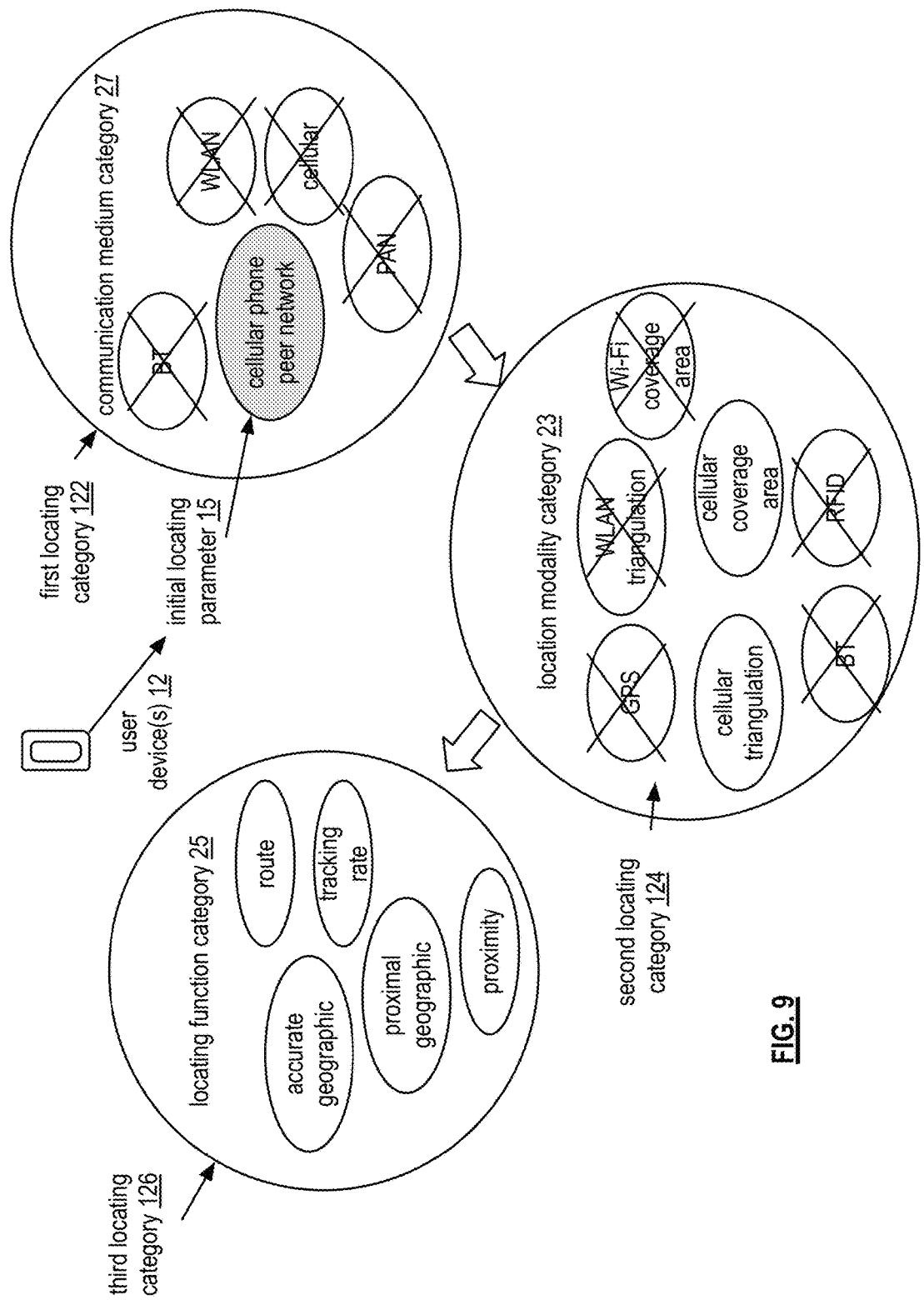
FIG. 9 is another example of selecting a plurality of locating category options in accordance with the present invention.

FIG. 9 is another example of selecting a plurality of locating category options. In this example, a subscriber device 22 is affiliated with a parent that wishes to track a child's location with user device 12. When location tracking is desired (e.g., based on a control server established rule, sensor data, and/or a device input), the user device 12 indicates that it only has connectivity via a cellular phone peer network. Based on this initial locating parameter 15, the communication medium category 27 is selected as the first locating category 122 and the cellular phone peer network option of the communication medium category 27 is selected as the first selected locating category option when available.

Because the only communication medium available to the user device 12 is the cellular phone peer network, the second locating category 124 (location modality category 23) is limited to cellular modality options (e.g., cellular triangulation and cellular coverage area). One or more of cellular triangulation and cellular coverage area are selected as the second selected locating category option. A third locating category option is then selected from the third locating category 126 (locating function category 25) based on one or more of the first and second selected locating category options. If both second selected locating category options are available (i.e., cellular triangulation and cellular coverage area are both available), one or more of proximity locating, route tracking, proximal geographical locating, tracking rate, and accurate geographical locating can be selected from the locating function category 25 as the third selected locating category option. If, however, only cellular coverage area is available, the locating function options are limited to one or more of proximity locating, route tracking, proximal geographical locating, and tracking rate.

Figure 10:
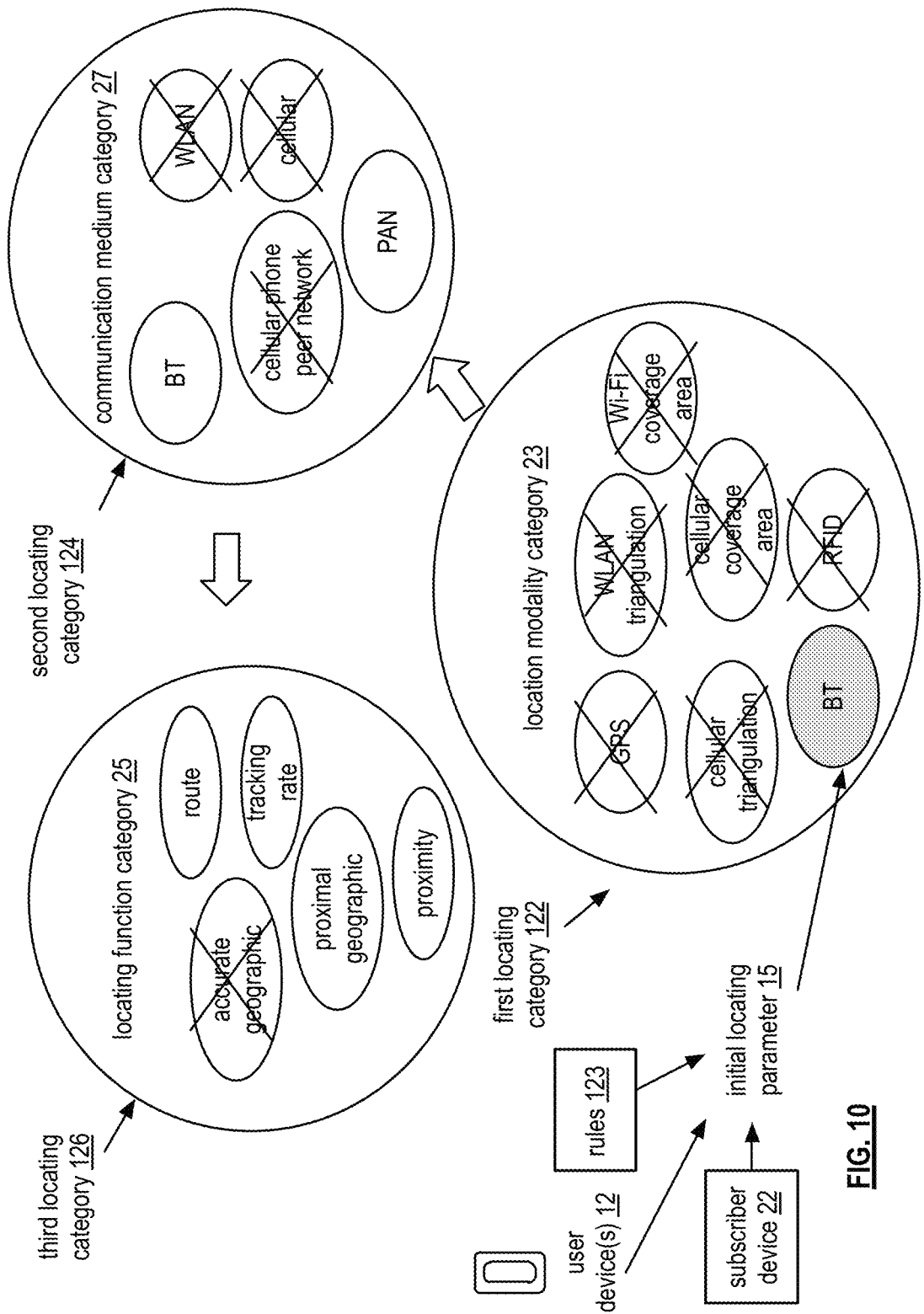
FIG. 10 is another example of selecting a plurality of locating category options in accordance with the present invention.

FIG. 10 is another example of selecting a plurality of locating category options. In this example, a subscriber device 22 is affiliated with a parent that wishes to track a child's location with user device 12. The subscriber device 22 indicates that Bluetooth (BT) tracking is available in the present location. For example, the parent and child are at the mall and the only location tracking modality present is Bluetooth. As another example, based on rules 123 established by the control server, Bluetooth is selected as a preferred location tracking modality under defined circumstances. As another example, the user device 12 indicates that BT tracking is available. Based on this initial locating parameter 15, the location modality category 23 is selected as the first locating category 122 and the Bluetooth option of the location modality category 23 is selected as the first selected locating category option when available.

Because the only location modality available is Bluetooth, the second locating category 124 (communication medium category 27) options are limited to the personal area network (PAN) option and the Bluetooth option. The personal area network option or the Bluetooth connection option is selected as the second selected locating category option. A third locating category option is then selected from the third locating category 126 (locating function category 25) based on one or more of the first and second selected locating category options. Because only Bluetooth is available for tracking, one or more of proximity locating, route tracking, proximal geographical locating, and tracking rate can be selected from the locating function category 25 as the third selected locating category option.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   obtaining a change indicator associated with location tracking communication from a first communication device to a second communication device regarding location information of the first communication device, wherein the location tracking communication is based on a first locating category option of a plurality of locating category options for an energy consumption function locating category and a second locating category option of another plurality of locating category options for a location modality category;
   selecting, in response to the change indicator, a different first locating category option from the plurality of locating category options;
   determining whether the different first locating category option affects a selection of the second locating category option; and
   when the different first locating category option does not affect the selection of the second locating category option, facilitating the location tracking communication from the first communication device to the second communication device regarding the location information of the first communication device based on the different first locating category option and the second locating category option.

2. The method of claim 1, wherein the change indicator comprises one or more of:
   an indication from one of the first and second communication devices prioritizing at least one of the first locating category and the different first locating category option;
   an indication based on established rules regarding locating the first communication device that prioritizes the first locating category and the different first locating category option;
   an indication that a status associated with the first communication device has changed including one or more of:
      travel detected towards a trusted place and/or a trusted watcher;
      arrival and/or departure detected at the trusted place and/or the trusted watcher;
      affiliation and/or de-affiliation detected with at least one trusted watcher;
      not moving for a movement timeframe;
      change in velocity detected;
      live location of the first communication device is no longer required; and
      located at the trusted place and/or the trusted watcher; and
   an indication that an additional locating category option is available for at least one of the plurality of locating categories.

3. The method of claim 1 further comprises:
   the plurality of locating category options of the location modality category includes global positioning system (GPS), wireless local area network (WLAN) triangulation, cellular triangulation, cellular coverage area, Wi-Fi coverage area, Bluetooth (BT), and radio frequency identification (RFID); and
   the plurality of locating category options of the energy consumption function locating category includes:
      establishing an energy consumption level to support moving towards a trusted place and/or a trusted watcher to include one or more of sleeping for a pre-determined timeframe, waking up when a sleep timer expires based on an estimated time of arrival at the trusted place and/or the trusted watcher, performing location updates less often than when located substantially with the trusted place and/or the trusted watcher, and reporting location upon arrival at the trusted place and/or the trusted watcher;
      consuming energy inversely in proportion to velocity such that the location updates are performed more often when a user of the first communication device is walking rather than a passenger of a vehicle in motion;

consuming the energy by utilizing energy of a communication device of the trusted watcher to perform one or more of determining the location information and the facilitating of the location tracking communication;

consuming the energy by utilizing energy of another communication device with a higher level of remaining stored battery energy of a plurality of available communication devices of one or more trusted watchers to perform one or more of the determining of the location information and the facilitating of the location tracking communication; and consuming the energy by utilizing energy of yet another communication device with a favorable identifier of the plurality of available communication devices of the one or more trusted watchers to perform one or more of the determining of the location information and the facilitating of the location tracking communication.

4. The method of claim 1 further comprises:

selecting establishing an energy consumption level to support moving towards a trusted place and/or a trusted watcher as the different first locating category option from the energy consumption function locating category based on the change indicator being travel detected towards the trusted place and/or the trusted watcher of the first communication device;

determining that the different first locating category option affects the selection of the second locating category option when the second locating category option includes Wi-Fi coverage area from the location modality category; and selecting one or more of GPS, cellular triangulation, and cellular coverage area as a different second locating category option from the location modality category based on the selection of the establishing the energy consumption level to support moving towards the trusted place and/or the trusted watcher as the different first locating category option.

5. The method of claim 1 further comprises:

selecting reporting location upon arrival at a trusted place and/or a trusted watcher as the different first locating category option from the energy consumption function locating category based on the change indicator being arrival detected at the trusted place and/or the trusted watcher of the first communication device;

determining that the different first locating category option affects the selection of the second locating category option when the second locating category option includes one or more of GPS, cellular triangulation, and cellular coverage area from the location modality category; and selecting one or more of Wi-Fi coverage area, BT, and RFID as a different second locating category option from the location modality category based on the selection of the reporting location upon arrival at the trusted place and/or the trusted watcher as the different first locating category option.

6. The method of claim 1 further comprises:

selecting reporting location upon a sleep timer expiring based on an estimated time of arrival at a trusted place and/or a trusted watcher as the different first locating category option from the energy consumption function locating category based on the change indicator being travel detected towards the trusted place and/or the trusted watcher of the first communication device;

determining that the different first locating category option affects the selection of the second locating category option when the second locating category option includes one or more of GPS, cellular triangulation, and cellular coverage area from the location modality category; and selecting one or more of Wi-Fi coverage area, BT, and RFID as a different second locating category option from the location modality category based on the selection of the reporting location upon the sleep timer expiring based on the estimated time of arrival at the trusted place and/or the trusted watcher as the different first locating category option.

7. The method of claim 1 further comprises:

selecting consuming energy by utilizing energy of a communication device of a trusted watcher to perform one or more of determining the location information and the facilitating of the location tracking communication as the different first locating category option from the energy consumption function locating category based on the change indicator being at least one of arrival of the first communication device detected at the trusted watcher, affiliation of the first communication device detected with the trusted watcher, and detection of the first communication device being located at the trusted watcher;

determining that the different first locating category option affects the selection of the second locating category option when the second locating category option includes one or more of GPS, cellular triangulation, and cellular coverage area from the location modality category; and selecting one or more of Wi-Fi coverage area, BT, and RFID as a different second locating category option from the location modality category based on the selection of the consuming energy by utilizing the energy of the communication device of the trusted watcher to perform one or more of determining the location information and the facilitating of the location tracking communication as the different first locating category option.

8. The method of claim 1, wherein the determining whether the different first locating category option affects the selection of the second locating category option and a selection of a third locating category option of yet another plurality of locating category options further comprises one or more of:

indicating to select a different second locating category option when the different first locating category option pairs unfavorably with at least one of the change indicator and the different first locating category option;

indicating to select the different second locating category option and a different third locating category option when the different first locating category option pairs unfavorably with at least one of the change indicator, the different first locating category option, the second locating category option, and the third locating category option;

indicating to select the different second locating category option when the different second locating category option has improved favorability over the second locating category option when the different second locating category option is paired with at least one of the change indicator and the different first locating category option; and indicating to select the different second locating category option and the different third locating category option when the different second locating category option utilized with the different third locating category option has improved favorability over utilization of the second locating category option and the third locating category option when the different second locating category option and the different third locating category option are both paired with at least one of the change indicator, the different first locating category option, the second locating category option, and the third locating category option.

9. The method of claim 1 further comprises:
when a proxy communication device is not utilized:
  the first communication device is associated with a person or object for which monitoring location is desired; and
  the second communication device is affiliated with another person desiring to monitor the person or object for which monitoring location is desired; and
when the proxy communication device is utilized:
  the first communication device is associated with the person or object for which monitoring location is desired;
  the proxy communication device facilitates the location tracking communication to provide the location information of the first communication device to the second communication device; and
  the second communication device is affiliated with the other person desiring to monitor the person or object for which monitoring location is desired.

10. The method of claim 1 further comprises:
facilitating the location tracking communication from the first communication device to the second communication device regarding the location information of the first communication device based on the different first locating category option and a different second locating category option from the other plurality of locating category options, where the different second locating category option is associated with favorable compatibility with the different first locating category option.

11. A computer readable memory comprises:
a first memory element that stores operational instructions that, when executed by a processing module causes the processing module to:
  obtain a change indicator associated with location tracking communication from a first communication device to a second communication device regarding location information of the first communication device, wherein the location tracking communication is based on a first locating category option of a plurality of locating category options for an energy consumption function locating category and a second locating category option of another plurality of locating category options for a location modality category;
a second memory element that stores operational instructions that, when executed by the processing module causes the processing module to:
  select, in response to the change indicator, a different first locating category option from the plurality of locating category options; and
  determine whether the different first locating category option affects a selection of the second locating category option; and
a third memory element that stores operational instructions that, when executed by the processing module causes the processing module to:
  when the different first locating category option does not affect the selection of the second locating category option, facilitate the location tracking communication from the first communication device to the second communication device regarding the location information of the first communication device based on the different first locating category option and the second locating category option.

12. The computer readable memory of claim 11, wherein the change indicator comprises one or more of:
an indication from one of the first and second communication devices prioritizing at least one of the first locating category and the different first locating category option;
an indication based on established rules regarding locating the first communication device that prioritizes the first locating category and the different first locating category option;
an indication that a status associated with the first communication device has changed including one or more of:
  travel detected towards a trusted place and/or a trusted watcher;
  arrival and/or departure detected at the trusted place and/or the trusted watcher;
  affiliation and/or de-affiliation detected with at least one trusted watcher;
  not moving for a movement timeframe;
  change in velocity detected;
  live location of the first communication device is no longer required; and
  located at the trusted place and/or the trusted watcher; and
an indication that an additional locating category option is available for at least one of the plurality of locating categories.

13. The computer readable memory of claim 11 further comprises:
the plurality of locating category options of the location modality category includes global positioning system (GPS), wireless local area network (WLAN) triangulation, cellular triangulation, cellular coverage area, Wi-Fi coverage area, Bluetooth (BT), and radio frequency identification (RFID); and
the plurality of locating category options of the energy consumption function locating category includes:
  establishing an energy consumption level to support moving towards a trusted place and/or a trusted watcher to include one or more of sleeping for a pre-determined timeframe, waking up when a sleep timer expires based on an estimated time of arrival at the trusted place and/or the trusted watcher, performing location updates less often than when located substantially with the trusted place and/or the trusted watcher, and reporting location upon arrival at the trusted place and/or the trusted watcher;
  consuming energy inversely in proportion to velocity such that the location updates are performed more often when a user of the first communication device is walking rather than a passenger of a vehicle in motion;

consuming the energy by utilizing energy of a communication device of the trusted watcher to perform one or more of determining the location information and the facilitating of the location tracking communication;

consuming the energy by utilizing energy of another communication device with a higher level of remaining stored battery energy of a plurality of available communication devices of one or more trusted watchers to perform one or more of the determining of the location information and the facilitating of the location tracking communication; and consuming the energy by utilizing energy of yet another communication device with a favorable identifier of the plurality of available communication devices of the one or more trusted watchers to perform one or more of the determining of the location information and the facilitating of the location tracking communication.

14. The computer readable memory of claim 11 further comprises:

the second memory element further stores operational instructions that, when executed by the processing module, causes the processing module to:

select establishing an energy consumption level to support moving towards a trusted place and/or a trusted watcher as the different first locating category option from the energy consumption function locating category based on the change indicator being travel detected towards the trusted place and/or the trusted watcher of the first communication device;

determine that the different first locating category option affects the selection of the second locating category option when the second locating category option includes Wi-Fi coverage area from the location modality category; and select one or more of GPS, cellular triangulation, and cellular coverage area as a different second locating category option from the location modality category based on the selection of the establishing the energy consumption level to support moving towards the trusted place and/or the trusted watcher as the different first locating category option.

15. The computer readable memory of claim 11 further comprises:

the second memory element further stores operational instructions that, when executed by the processing module, causes the processing module to:

select reporting location upon arrival at a trusted place and/or a trusted watcher as the different first locating category option from the energy consumption function locating category based on the change indicator being arrival detected at the trusted place and/or the trusted watcher of the first communication device;

determine that the different first locating category option affects the selection of the second locating category option when the second locating category option includes one or more of GPS, cellular triangulation, and cellular coverage area from the location modality category; and select one or more of Wi-Fi coverage area, BT, and RFID as a different second locating category option from the location modality category based on the selection of the reporting location upon arrival at the trusted place and/or the trusted watcher as the different first locating category option.

16. The computer readable memory of claim 11 further comprises:

the second memory element further stores operational instructions that, when executed by the processing module, causes the processing module to:

select reporting location upon a sleep timer expiring based on an estimated time of arrival at a trusted place and/or a trusted watcher as the different first locating category option from the energy consumption function locating category based on the change indicator being travel detected towards the trusted place and/or the trusted watcher of the first communication device;

determine that the different first locating category option affects the selection of the second locating category option when the second locating category option includes one or more of GPS, cellular triangulation, and cellular coverage area from the location modality category; and select one or more of Wi-Fi coverage area, BT, and RFID as a different second locating category option from the location modality category based on the selection of the reporting location upon the sleep timer expiring based on the estimated time of arrival at the trusted place and/or the trusted watcher as the different first locating category option.

17. The computer readable memory of claim 11 further comprises:

the second memory element further stores operational instructions that, when executed by the processing module, causes the processing module to:

select consuming energy by utilizing energy of a communication device of a trusted watcher to perform one or more of determining the location information and the facilitating of the location tracking communication as the different first locating category option from the energy consumption function locating category based on the change indicator being at least one of arrival of the first communication device detected at the trusted watcher, affiliation of the first communication device detected with the trusted watcher, and detection of the first communication device being located at the trusted watcher;

determine that the different first locating category option affects the selection of the second locating category option when the second locating category option includes one or more of GPS, cellular triangulation, and cellular coverage area from the location modality category; and select one or more of Wi-Fi coverage area, BT, and RFID as a different second locating category option from the location modality category based on the selection of the consuming energy by utilizing the energy of the communication device of the trusted watcher to perform one or more of determining the location information and the facilitating of the location tracking communication as the different first locating category option.

18. The computer readable memory of claim 11 further comprises:

the second memory element further stores operational instructions that, when executed by the processing module, causes the processing module to determine whether the different first locating category option affects the selection of the second locating category option and a selection of a third locating category option of yet another plurality of locating category options by one or more of:

indicating to select a different second locating category option when the different first locating category option pairs unfavorably with at least one of the change indicator and the different first locating category option;

indicating to select the different second locating category option and a different third locating category option when the different first locating category option pairs unfavorably with at least one of the change indicator, the different first locating category option, the second locating category option, and the third locating category option;

indicating to select the different second locating category option when the different second locating category option has improved favorability over the second locating category option when the different second locating category option is paired with at least one of the change indicator and the different first locating category option; and indicating to select the different second locating category option and the different third locating category option when the different second locating category option utilized with the different third locating category option has improved favorability over utilization of the second locating category option and the third locating category option when the different second locating category option and the different third locating category option are both paired with at least one of the change indicator, the different first locating category option, the second locating category option, and the third locating category option.

19. The computer readable memory of claim 11 further comprises:

when a proxy communication device is not utilized:
the first communication device is associated with a person or object for which monitoring location is desired; and the second communication device is affiliated with another person desiring to monitor the person or object for which monitoring location is desired; and when the proxy communication device is utilized:
the first communication device is associated with the person or object for which monitoring location is desired;

the proxy communication device facilitates the location tracking communication to provide the location information of the first communication device to the second communication device; and the second communication device is affiliated with the other person desiring to monitor the person or object for which monitoring location is desired.

20. The computer readable memory of claim 11 further comprises:

the third memory element further stores operational instructions that, when executed by the processing module, causes the processing module to:

facilitate the location tracking communication from the first communication device to the second communication device regarding the location information of the first communication device based on the different first locating category option and a different second locating category option from the other plurality of locating category options, where the different second locating category option is associated with favorable compatibility with the different first locating category option.

\* \* \* \* \*